(12) United States Patent
Malloch et al.

(10) Patent No.: US 12,128,923 B2
(45) Date of Patent: Oct. 29, 2024

(54) MULTI-OBJECTIVE BAYESIAN OPTIMIZATION OF MACHINE LEARNING MODEL FOR AUTONOMOUS VEHICLE OPERATION

(71) Applicant: GM Cruise Holdings LLC, San Francisco, CA (US)

(72) Inventors: Jeremy Adam Malloch, San Francisco, CA (US); Burkay Donderici, Burlingame, CA (US); Siyuan Lu, San Mateo, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 335 days.

(21) Appl. No.: 17/690,242

(22) Filed: Mar. 9, 2022

(65) Prior Publication Data
US 2023/0286539 A1 Sep. 14, 2023

(51) Int. Cl.
| | |
|---|---|
| B60W 60/00 | (2020.01) |
| G06N 3/04 | (2023.01) |
| G06T 7/20 | (2017.01) |
| G06T 7/50 | (2017.01) |
| G06V 10/82 | (2022.01) |
| G06V 20/58 | (2022.01) |

(52) U.S. Cl.
CPC .......... *B60W 60/0011* (2020.02); *G06N 3/04* (2013.01); *G06T 7/20* (2013.01); *G06T 7/50* (2017.01); *G06V 10/82* (2022.01); *G06V 20/58* (2022.01); *B60W 2420/403* (2013.01); *G06T 2207/10028* (2013.01); *G06T 2207/20081* (2013.01); *G06T 2207/20084* (2013.01); *G06T 2207/30252* (2013.01)

(58) Field of Classification Search
CPC ........ B60W 60/0011; G06T 7/50; G06T 7/20; G06V 20/58; G06V 10/82; G06N 3/04
See application file for complete search history.

(56) References Cited

U.S. PATENT DOCUMENTS

| | | | |
|---|---|---|---|
| 10,796,204 B2* | 10/2020 | Rohani | G05D 1/0088 |
| 11,938,828 B2* | 3/2024 | Husain | B60L 3/0046 |
| 2019/0205765 A1* | 7/2019 | Mondello | G06N 3/045 |
| 2021/0323578 A1* | 10/2021 | Wang | B60W 50/045 |
| 2021/0347379 A1* | 11/2021 | Je | B60W 60/001 |
| 2022/0227231 A1* | 7/2022 | Husain | B60L 15/2045 |
| 2022/0230021 A1* | 7/2022 | Muehlenstaedt | G06V 10/7753 |

(Continued)

*Primary Examiner* — Peter D Nolan
*Assistant Examiner* — Mikko Okechukwu Obioha
(74) *Attorney, Agent, or Firm* — Michael DiCato

(57) ABSTRACT

Machine learning model optimization systems and methods are disclosed. A system receives sensor data captured by one or more sensors of a vehicle during a first time period. The vehicle uses a first trained machine learning (ML) model for one or more decisions of a first decision type during the first time period. The system generates a second trained ML model at least in part by using the sensor data to train the second trained ML model. The system identifies an optimal trained ML model from a plurality of trained ML models. The plurality of trained ML models includes the first trained ML model and the second trained ML model. The system causes the vehicle to use the optimal trained ML model for one or more further decisions of the first decision type during a second time period after the first time period.

20 Claims, 10 Drawing Sheets

(56) References Cited

U.S. PATENT DOCUMENTS

2022/0402521 A1* 12/2022 Hetang .............. B60W 60/0011
2023/0089978 A1*  3/2023 Pulver .................. G05D 1/0246
                                                          701/26
2023/0227061 A1*  7/2023 Ziebart ............... B60W 60/001
                                                          701/25

* cited by examiner

FIG. 8

MULTI-OBJECTIVE BAYESIAN OPTIMIZATION OF MACHINE LEARNING MODEL FOR AUTONOMOUS VEHICLE OPERATION

TECHNICAL FIELD

The present technology generally pertains to machine learning models for autonomous vehicle operation. More specifically, the present technology pertains to continuous generation of trained machine learning models for operation of autonomous vehicle(s) based on training data that the autonomous vehicle(s) continue to gather, and selection of optimal models for operation of the autonomous vehicle(s).

BACKGROUND

Autonomous vehicles (AVs) are vehicles having computers and control systems that perform driving and navigation tasks that are conventionally performed by a human driver. As AV technologies continue to advance, a real-world simulation for AV testing has been critical in improving the safety and efficiency of AV driving.

Machine learning systems generate trained machine learning models based on training data. Generally, different sets of training data result in different machine learning models. Some trained machine learning models may be more effective, and/or more efficient, than others.

BRIEF DESCRIPTION OF THE DRAWINGS

The advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 8 is a block diagram illustrating an example of training a base model for one-shot evaluations over four batches of data, in accordance with some examples;

DETAILED DESCRIPTION

Figure 1:
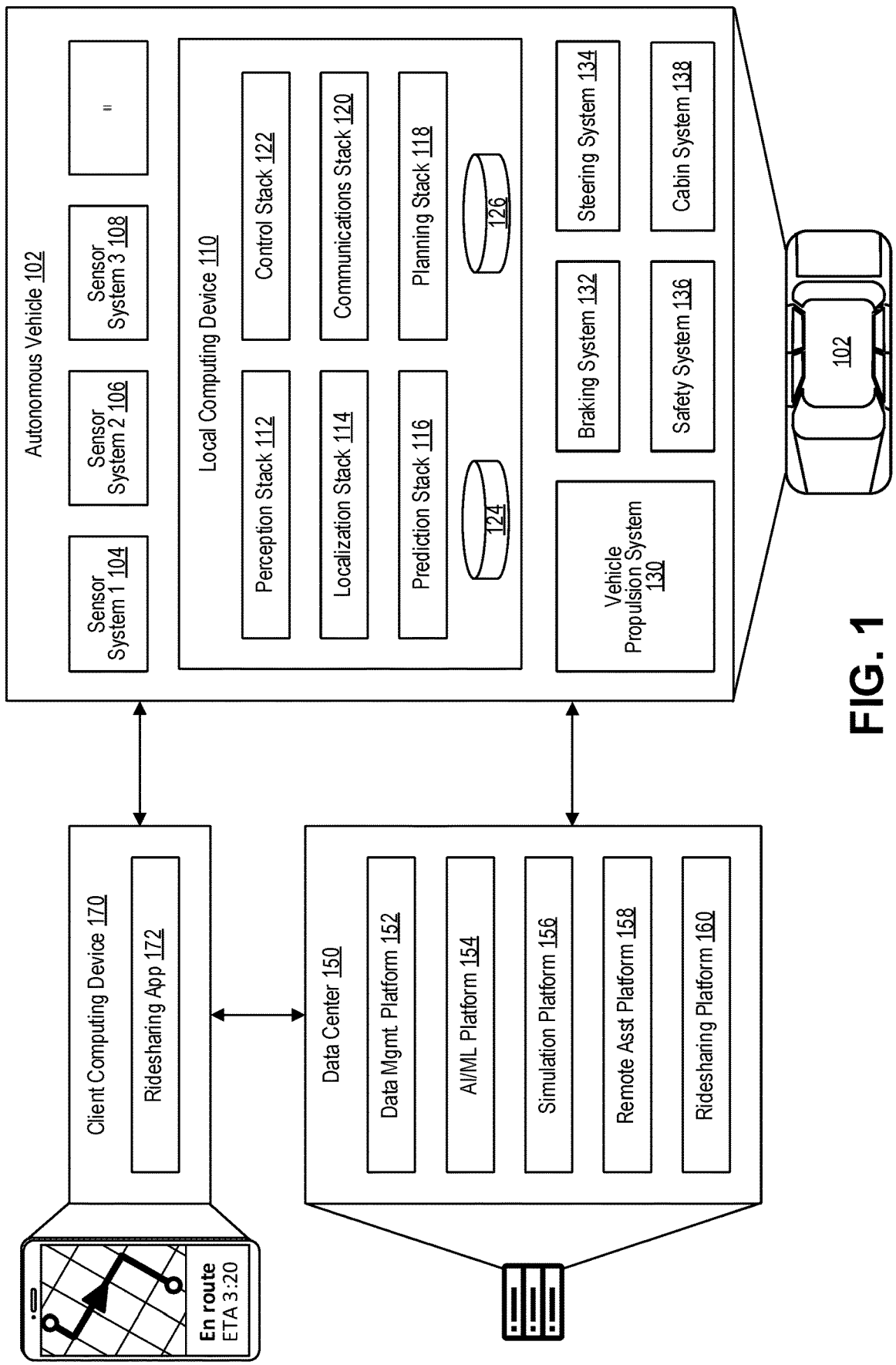
FIG. 1 illustrates an example of a system for managing one or more autonomous vehicles (AVs) in accordance with some aspects of the present technology.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

Autonomous vehicles (AVs) are vehicles having computers and control systems that perform driving and navigation tasks that are conventionally performed by a human driver. As AV technologies continue to advance, a real-world simulation for AV testing has been critical in improving the safety and efficiency of AV driving.

An Autonomous Vehicle (AV) is a motorized vehicle that can navigate without a human driver. An exemplary autonomous vehicle includes a plurality of sensor systems, such as, but not limited to, a camera sensor system, a Light Detection and Ranging (LIDAR) sensor system, a Radio Detection and Ranging (RADAR) sensor system, a Sound Detection and Ranging (SODAR) amongst others. The autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system. Similar sensors may also be mounted onto non-autonomous vehicles, for example onto vehicles whose sensor data is used to generate or update street maps.

In some examples, an AV may use one or more trained machine learning (ML) models for various processes, operations, and/or decisions. For example, an AV may use one or more trained ML models for object recognition, point data clustering, boundary generation, object tracking, object prediction, environment mapping, routing of the AV through the environment, vehicle actuation controls, or combinations thereof. Machine learning systems of an AV, or one or more computing systems that the AV can interact with (e.g., to update the trained ML models that the AV uses), can generate trained machine learning models based on training data. Generally, different sets of training data result in different machine learning models. Some trained machine learning models may be more effective, and/or more efficient, than others. The training data can include data gathered by the AV itself, such as sensor data and/or various processes, operations, and/or decisions made by the AV and/or by a human operator corresponding to the sensor data. An ML model optimization system can identify and/or generate an optimal trained ML model, for instance by selecting a Pareto-optimal trained ML model from a Pareto front of previously generated and evaluated trained ML models, in some cases re-training the optimal trained ML model from scratch before use.

Machine learning model optimization systems and methods are disclosed. A system receives sensor data captured by one or more sensors of a vehicle during a first time period, in some cases along with information about processes, operations, and/or decisions made within the first time period as well (e.g., made based on the sensor data). The vehicle uses a first trained machine learning (ML) model for one or more decisions of a first decision type during the first time period. The first trained ML model may have previously been identified as optimal. The system generates a second trained ML model at least in part by using the sensor data to train the second trained ML model. The system identifies an optimal trained ML model from a plurality of trained ML models. For instance, the optimal trained ML model may be Pareto-optimal and selected from a Pareto front generated by evaluating the plurality of trained ML models. The plurality of trained ML models includes the first trained ML model and the second trained ML model. In some cases, the optimal trained ML model may be the second trained ML model, the first trained ML model, or another trained ML model of the plurality of trained ML models. The system causes the vehicle to use the optimal trained ML model for one or more further decisions of the first decision type during a second time period. The second time period is after the first time period.

FIG. 1 illustrates an example of an AV management system 100. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include different types of sensors and can be arranged about the AV 102. For instance, the sensor systems 104-108 can comprise Inertial Measurement Units (IMUs), cameras (e.g., still image cameras, video cameras, etc.), light sensors (e.g., cameras, image sensors, LIDAR systems, pseudo-LIDAR systems, ambient light sensors, infrared sensors, etc.), RADAR systems, positioning receivers (e.g., Global Positioning System (GPS) receivers, Global Navigation Satellited System (GNSS) receivers, etc.), audio sensors (e.g., microphones, Sound Detection and Ranging (SODAR) systems, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other embodiments may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some embodiments, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can additionally include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some embodiments, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some embodiments, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some embodiments, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Figure 2:
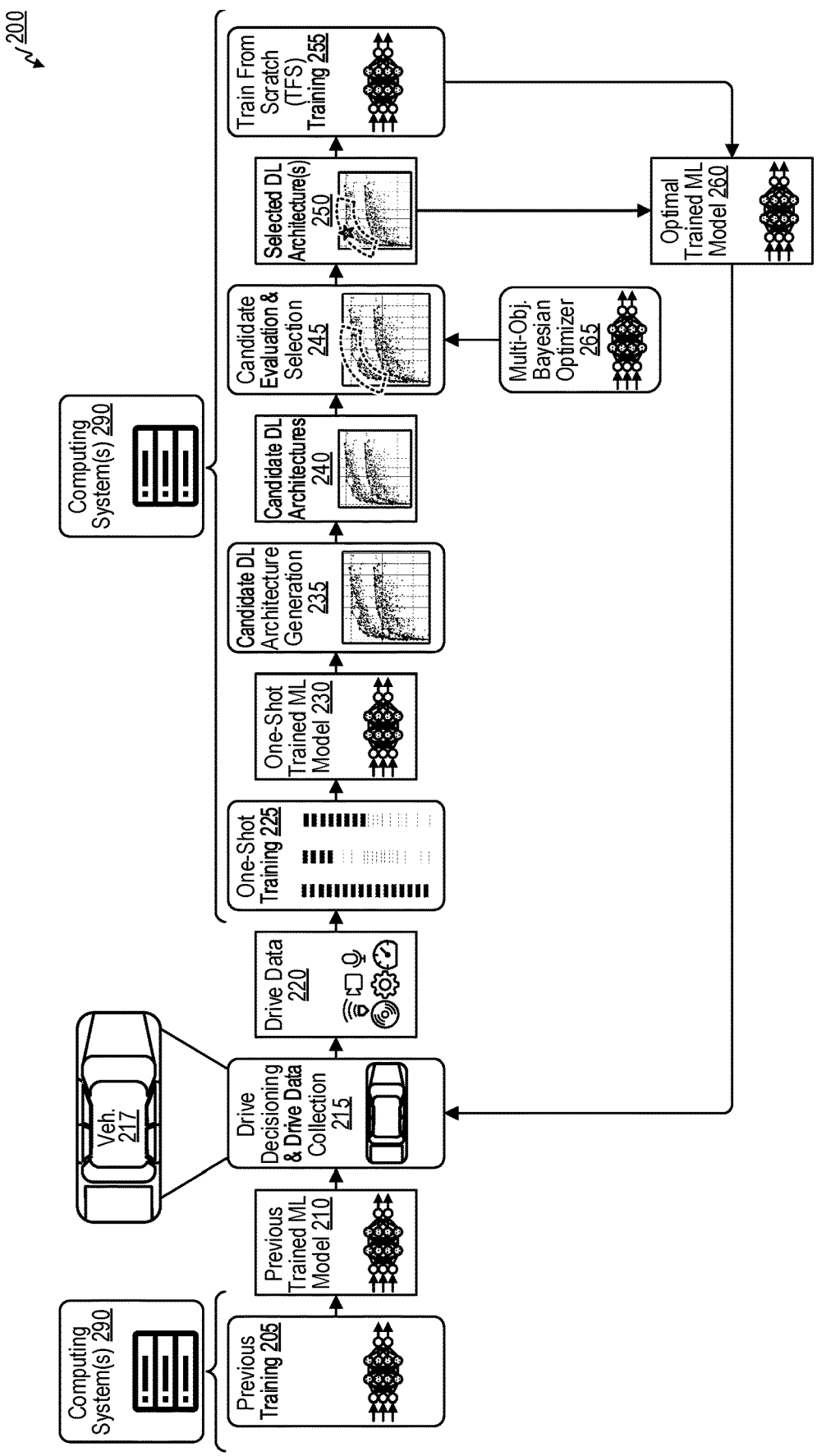
FIG. 2 is a block diagram illustrating an architecture of an exemplary machine learning (ML) model optimization system, in accordance with some aspects of the present technology.

FIG. 2 is a block diagram illustrating an architecture of an exemplary machine learning (ML) model optimization system 200. In some examples, the ML model optimization system 200 includes one or more vehicles 217. In some examples, at least one of the vehicle(s) 217 includes the ML model optimization system 200. In some examples, at least one vehicle of the vehicle(s) 217 may be an AV 102 that is able to traverse its environment (e.g., drive) autonomously. In some examples, at least one vehicle of the vehicle(s) 217 may have a human operator (e.g., driver) operating, controlling, and/or overseeing at least some aspects of the vehicle, even if certain aspects of the vehicle are automatic and/or autonomous.

The ML model optimization system 200 includes one or more computing systems 290. The computing system(s) 290 include one or more computing systems 1000 of FIG. 10, or at least a subset thereof. In some examples, the computing system(s) 290 includes the data center 150 of FIG. 1, or at least a subset thereof. In some examples, the computing system(s) 290 includes the local computing device 110 of the AV 102 of FIG. 1, or at least a subset thereof. The one or more computing systems 290 can perform various machine learning (ML) model and ML architecture generation, training, updating, evaluation, selection, optimization, or a combination thereof.

The vehicle 217 and/or another element of the ML model optimization system 200 performs drive decisioning and drive data collection 215 using a drive decisioning engine and/or drive data collection engine. The drive decisioning and drive data collection 215 includes performance of drive decisioning (e.g., by a drive decisioning engine) that uses a previous trained ML model 210 to make various decisions associated with operation of the vehicle 217. The drive decisioning and drive data collection 215 includes performance of drive data collection (e.g., by a drive data collection engine) that collects drive data 220 and sends the drive data 220 to the computing systems 290 for use as training data for one or more ML model(s) and/or ML architectures as described herein. The drive data 220 can include sensor data collected by sensor(s) of the vehicle 217, decisions made regarding operation of the vehicle 217 (e.g., using the previous trained ML model 210 to perform the drive decisioning), or a combination thereof. In some examples, at least a subset of the decisions are made autonomously or semi-autonomously, and are made using the previous trained ML model 210 in response to input of drive data 220 (e.g., sensor data and/or other decisions) into the previous trained ML model 210.

The decisions associated with the operation of the vehicle 217 that made by the drive decisioning engine during drive decisioning and drive data collection 215 using the previous trained ML model 210 include, for example, decisions regarding whether to cluster a set of points of depth sensor data (e.g., captured by depth sensor(s) of the vehicle 217) together, decisions regarding whether to recognize a set of sensor data (e.g., captured by sensor(s) of the vehicle 217) as being a representation of a known object, decisions regarding tracking a path of an object in the environment that the vehicle 217 is in (e.g., based on sensor data captured by the sensor(s) of the vehicle 217), decisions regarding predicting a path of an object through the environment, decisions regarding how to map the environment around the vehicle, decisions regarding how to route the vehicle through the environment, decisions regarding what vehicle controls to actuate (e.g., when the vehicle actuates brakes, an accelerator, steering and/or turning controls, or a combination thereof), or a combination thereof. These processes, operations, and/or decisions may be made based on the sensor data (e.g., a camera view of the environment, a LIDAR view of the environment, a RADAR view of the environment, information about the current status of the vehicle such as current speed and/or position, or a combination thereof), based on data that is generated by the vehicle based on sensor data (e.g., a map of the environment, paths of objects other than the vehicle within the environment), based on an operator's understanding of the vehicle and its environment (e.g., based on a driver's view through the windows of the vehicle), based on decisions made by an operator (e.g., to turn a steering wheel or press a brake or accelerator pedal), based on decisions made autonomously by or for the vehicle (e.g., a route for the vehicle or an autonomous actuation of an accelerator or brake or turning mechanism), or a combination thereof.

Based on the decisioning and drive data collection 215, the vehicle 217 provides drive data 220 to the computing system 290. For instance, the vehicle 217 uses one or more transmitters of the vehicle 217 to provide the drive data 220 to a receiver of the computing system 290. Eventually, as described further herein, the computing system 290 provides an optimal trained ML model 260 to the vehicle 217. For instance, the computing system 290 uses one or more transmitters of the computing system 290 to provide the optimal trained ML model 260 to one or more receivers of the vehicle 217. As such, the vehicle 217 and the computing system 290 each respectively have receiver(s), transmitter(s), and/or transceiver(s). In some examples, the receiver(s) and the transmitter(s) are separate components. In some examples, a single component—a transceiver—can act both as one of the receiver(s) and as one of the transmitter(s). The receiver(s) and the transmitter(s) can include one or more transceivers. In some examples, receiver(s) and the transmitter(s) include wired receiver(s), transmitter(s), and/or transceiver(s) that receive data (e.g., drive data 220) from the vehicle(s) 217 and/or transmit data (e.g., optimal trained ML model 260) to the vehicle(s) 217 over a wired interface. In some examples, receiver(s) and the transmitter(s) include wireless receiver(s), transmitter(s), and/or transceiver(s) that receive data (e.g., the drive data 220) from the vehicle(s) 217 and/or transmit data (e.g., optimal trained ML model 260) to the vehicle(s) 217 over a wireless interface. The wired interface(s), receiver(s), transmitter(s), and/or transceiver(s) can include any wired connection(s), interface(s), receiver(s), transmitter(s), and/or transceiver(s) discussed with respect to the communications interface 1040 (e.g., USB, Lightning, Ethernet, LAN, fiber optic). The wireless interface(s), receiver(s), transmitter(s), and/or transceiver(s) can include any wireless connection(s), interface(s), receiver(s), transmitter(s), and/or transceiver(s) discussed with respect to the communications interface 1040 (e.g., Wi-Fi, WLAN, Bluetooth, cellular, NFC, RFID). In some examples, the wired and/or wireless interface(s), receiver(s), transmitter(s), and/or transceiver(s) can receive data (e.g., the drive data 220) from a vehicle of the vehicle(s) 217 and/or transmit data (e.g., optimal trained ML model 260) to the vehicle of the vehicle(s) 217 while the vehicle is stopped, for example while the vehicle is parked, refueling, recharging, calibrating or recalibrating its sensors, at a service center, in a garage, with a mechanic or engineer, or a combination thereof. In some examples, at least one of the computing systems(s) 290 may be located at such a parking space, refueling station, recharging station, calibration station, service center, garage, mechanic's shop, engineering area, or a combination thereof. In some examples, the wireless interface(s), receiver(s), transmitter(s), and/or transceiver(s) of the computing system(s) 290 can receive data (e.g., the drive data 220) from a vehicle of the vehicle(s) 217 and/or transmit data (e.g., the optimal trained ML model 260) to the vehicle 217 of the vehicle(s) 217 while the vehicle is stopped, driving, or otherwise in motion.

The drive data 220 can include sensor data captured by the sensor(s) of the vehicle(s) 217, for instance captured by the sensor systems 104, 106, and 108 of the AV 102. The sensor data of the drive data 220 can include sensor data captured by one or more image sensors (e.g., of one or more cameras), one or more depth sensors, one or more microphones, one or more pose sensors, one or more vehicle status sensors, or a combination thereof. The depth sensor(s) can include, for instance, LIDAR sensor(s), pseudo-LIDAR sensor(s), RADAR sensor(s), SONAR sensor(s), SODAR sensor(s), ultrasonic sensor(s), laser rangefinder(s), ToF sensor(s), structured light sensor(s), or combinations thereof. Depth sensors may also be referred to as range sensors or distance sensors. The pose sensor(s) can include, for instance, inertial measurement unit(s), gyroscope(s), gyrometer(s), accelerometer(s), altimeter(s), barometer(s), positioning receiver(s), or combinations thereof. The positioning receiver(s) can include, for instance, GNSS receiver(s), GPS receiver(s), altimeter(s), barometer(s), Wi-Fi transceivers, cellular network transceivers, wireless local area network (WLAN) transceivers, Bluetooth transceivers, beacon transceivers, personal area network (PAN) transceivers, municipal area network (MAN) transceivers, wide area network (WAN) transceivers, communication interface(s) 1040, or combinations thereof. The vehicle status sensor(s), such as engine sensor(s), speedometer(s), tachometer(s), odometer(s), altimeter(s), tilt sensor(s), impact sensor(s), airbag sensor(s), seat occupancy sensor(s), open/closed door sensor(s), on/off light sensor(s), tire pressure sensor(s), rain sensor(s), or combinations thereof.

The drive data 220 can include data generated by the vehicle(s) 217 based on the sensor data, for example including extracted features, clusters of depth data points, object recognition tags or boundaries, tracked paths of objects, predicted paths of objects, maps of the environment around a vehicle, and/or planned routes for the vehicle. The drive data 220 can include data one or more processes, operations, and/or decisions made by the vehicle(s) 217 and/or by operator(s) of the vehicle(s) 217, for instance including decisions regarding whether to cluster a set of points together, decisions regarding whether to recognize a set of sensor data as being a representation of a known object, decisions regarding tracking a path of an object, decisions regarding predicting a path of an object, decisions regarding how to map the environment around the vehicle, decisions regarding how to route the vehicle through the environment, decisions regarding what vehicle controls to actuate (e.g., when the vehicle actuates brakes, an accelerator, steering and/or turning controls, or a combination thereof), or a combination thereof. These processes, operations, and/or decisions may be made based on the sensor data (e.g., a camera view of the environment, a LIDAR view of the environment, information about the current status of the vehicle such as current speed and/or position, or a combination thereof), based on data that is generated by the vehicle based on sensor data (e.g., a map of the environment, paths of objects other than the vehicle within the environment), based on an operator's understanding of the vehicle and its environment (e.g., based on a driver's view through the windows of the vehicle), based on decisions made by an operator (e.g., to turn a steering wheel or press a brake or accelerator pedal), based on decisions made by the vehicle (e.g., a route for the vehicle or an autonomous actuation of an accelerator or brake or turning mechanism), or a combination thereof. In some examples, some of the decisions made autonomously or semi-autonomously by the vehicle are made using a trained machine learning (ML) model.

The computing system(s) 290 receives the drive data 220 and passes the drive data 220 to a one-shot training engine to perform one-shot training 225 to generate a one-shot trained ML model 230. The one-shot training 225 involves grouping the one-shot trained ML model 230 into units (e.g., connected channels) to be pruned together. For each batch in training, a pruning level is stochastically selected for each connected channel independently, for instance as illustrated in and described with respect to FIG. 7 and FIG. 8.

Once the one-shot training engine performs the one-shot training 225 to generate the one-shot trained ML model 230, the computing system(s) 290 use the one-shot trained ML model 230 to perform candidate deep learning (DL) architecture generation 235 to generate candidate DL architectures 240. The computing system(s) 290 perform candidate evaluation and selection 245 on the candidate DL architectures 240 to evaluate each of the candidate DL architectures 240 and to select one or more selected candidate DL architecture(s) 250 of the candidate DL architectures 240 based on the evaluations. The evaluations may be guided and/or controlled by a multi-objective Bayesian optimizer 265.

In some examples, to evaluate the candidate DL architectures 240 during candidate evaluation and selection 245, the computing system(s) 290 may evaluate the candidate DL architectures 240 by running ablation evaluations, testing individual connected channels (or small groups) to see how much functional regression occurs. Selecting candidate architectures to evaluate with the one-shot methodology is based on information regarding how sensitive each connected channel is to pruning. Identifying the less sensitive connected channels allows them to be pruned preferentially, resulting in lower functional regression and lower degradation of accuracy.

In some examples, to evaluate the candidate DL architectures 240 during candidate evaluation and selection 245, the computing system(s) 290 may train a model (e.g. the one-shot trained ML model 230 trained during one-shot training 225) that includes the set of all of the candidate DC architectures 240 as subnetworks. In some cases, the evaluations may and/or selections may be based on changes in the number of channels and/or number of convolution filters in each connected channel, rather than changes in network topology or types of layers. Such evaluations may be performed by defining a set of pruning masks for each connected channel before we initiate training, and then on a per batch basis, selecting one of those masks to use, for each connected channel. For instance, if, for each batch, computing system(s) 290 store the training loss and mask configuration used, the computing system(s) 290 have approximately 500 k-1 M samples of each mask configuration for that connected channel (assuming 2-3 M batches and 3-4 mask configurations for that connected channel). For each configuration, the computing system(s) 290 can compute the average loss (e.g., mean loss) as a form of evaluation.

In some examples, to evaluate and/or select the candidate DL architectures 240 during candidate evaluation and selection 245, the computing system(s) 290 may use a multi-objective Bayesian optimizer 265 (e.g., a multi-objective Bayesian optimization algorithm and/or system). The multi-objective Bayesian optimizer 265 may identify and/or use a metric as a proxy for functional performance. Examples of such a metric include Intersection over Union (IoU), panoptic quality (PQ), mean squared error (MSE), or a combination thereof. In some examples, IoU can be calculated using the equation $$IoU = \frac{\text{Prediction} \cap \text{Ground Truth}}{\text{Prediction} \cup \text{Ground Truth}}$$

In some examples, PQ can be calculated using the equation $$PQ = \frac{\Sigma_{(p,g) \in TP} IoU(p, g)}{|TP| + \frac{1}{2}|FP| + \frac{1}{2}|FN|} = SQ \cdot RQ,$$

where TP represents true positives, FP represents false positives, FN represents false negatives, SQ represents segmentation quality, and RQ represents recognition quality. The multi-objective Bayesian optimizer 265 may use either flops and/or latency (e.g., predicted with an early latency estimation (ELE) approach) as the second objective, constructing one or more pareto frontier(s).

Figure 3:
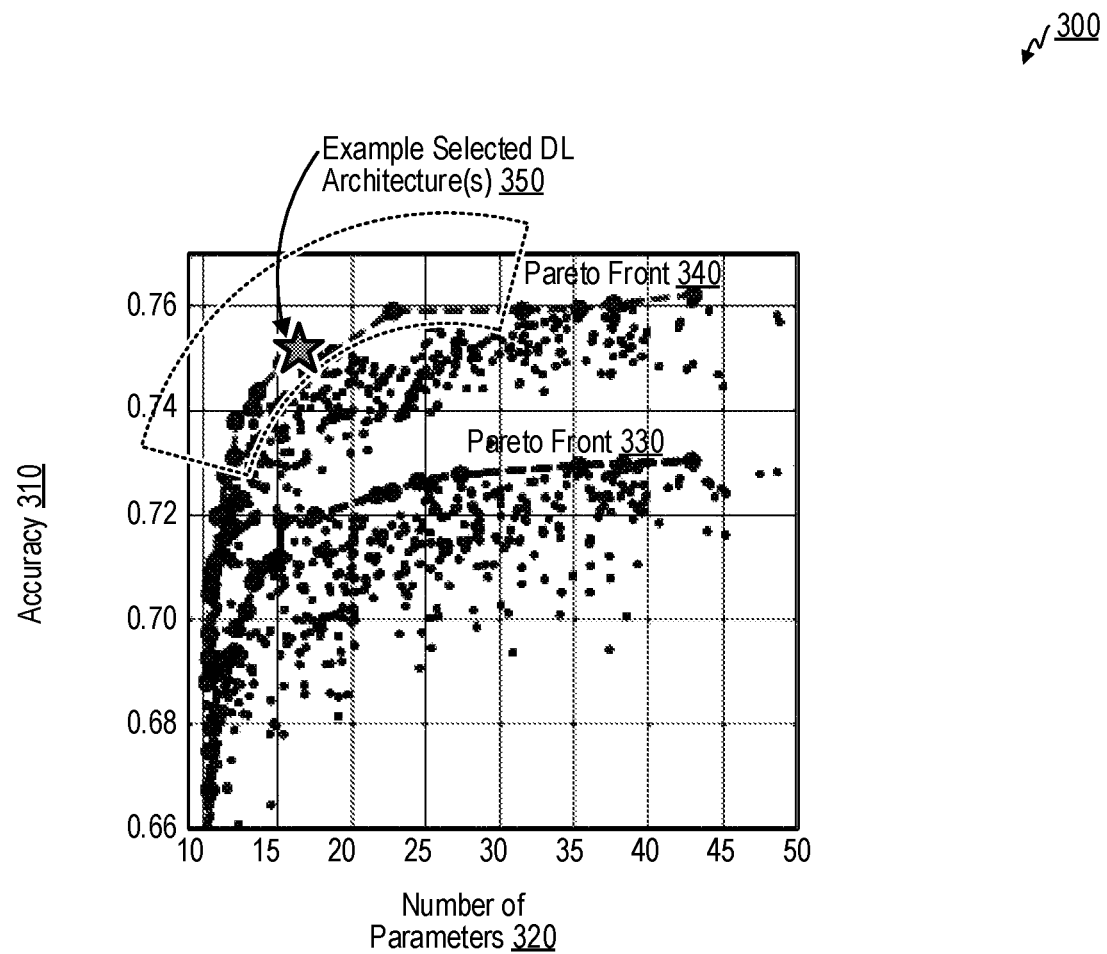
FIG. 3 is Pareto front graph with evaluations of candidate deep learning (DL) architectures, in accordance with some aspects of the present technology.

During candidate evaluation and selection 245, the computing system(s) 290 can evaluate the candidate DL architectures 240 and organize the evaluations of the candidate DL architectures 240 into one or more Pareto fronts (or Pareto frontiers) to compare the candidate DL architectures 240, as in the Pareto front graph 300 of FIG. 3. The candidate evaluation and selection 245 can identify (e.g., select, determine, generate) one or more selected DL architectures 250 from the candidate DL architectures 240. In some examples, one of the selected DL architecture(s) 250 can be, or can be used as a basis of, the optimal trained ML model 260. In some cases, the selected DL architecture(s) 250 are each Pareto optimal, and for instance can be selected based on the position of the evaluation of the optimal trained ML model 260 in the Pareto front. In some examples, the selected DL architecture(s) 250 are the architectures whose respective evaluations that appear along an edge of the Pareto front (e.g., the upper edge, leftmost edge, and/or upper-left edge of the Pareto front 340 of FIG. 3). In some examples, selected DL architecture(s) 250 may be automatically selected by the computing system(s) 290 from among the candidate DL architectures 240 for use to generate the optimal trained ML model 260, for instance to optimize based on predetermined optimality criteria for the optimal trained ML model 260 (e.g., whether accuracy or speed is more important for a particular type(s) of decision(s) to be made using the optimal trained ML model 260). In some examples, a user of the computing system(s) 290 may select the selected DL architecture(s) 250 from among the candidate DL architectures 240 for use to generate the optimal trained ML model 260, for instance based on the predetermined optimality criteria. In some examples, the candidate evaluation and selection 245 may automatically select the optimal trained ML model 260 from among the one or more optimal trained ML models, for instance to optimize based on any of the predetermined optimality criteria. In some examples, during candidate evaluation and selection 245, the computing system(s) 290 can prune the candidate DL architectures 240 using one-shot pruning to identify (e.g., select, determine, generate) and/or optimize selected DL architecture(s) 250 to eventually generate the optimal trained ML model 260. In some examples, during candidate evaluation and selection 245, the computing system(s) 290 can remove, or prune, certain candidate DL architectures 240 from the set of candidate DL architectures 240 if they are less optimal than one or more thresholds according to one or more properties (e.g., a threshold accuracy along the accuracy 310 axis, a threshold number of parameters along the number of parameters 320 axis, efficiency, speed, or combinations thereof). In some examples, efficiency and/or speed may be inversely related to number of parameters.

In some examples, during candidate evaluation and selection 245, the computing system(s) 290 generate the optimal trained ML model 260 directly from the selected DL architecture(s) 250, for instance by incorporating parameters of the vehicle 217 into the selected DL architecture(s) 250. In some examples, following candidate evaluation and selection 245, the computing system(s) 290 performs training from scratch (TFS) training 255 to generate the train the optimal trained ML model 260 from scratch to re-generate the optimal trained ML model 260. In some examples, during TFS training 255, the computing system(s) 290 can train the optimal trained ML model 260 from scratch based on certain parameters of the vehicle 217 that the optimal trained ML model 260 will be sent to (by the transmitter(s) of the computing system(s) 290) and used in. In some examples, during TFS training 255, the computing system(s) 290 can train the optimal trained ML model 260 from scratch to be more optimized, for example by using one-shot pruning and/or quantization to remove certain connections within the optimal trained ML model 260 that are redundant or have low saliency (e.g., less salient than a saliency threshold), to set weights that are redundant or have low saliency (e.g., less salient than a saliency threshold) to zero, to reduce the number of bits required to represent certain values, to reduce memory storage and computation costs of use of the optimal trained ML model 260, to improve certain properties of the optimal trained ML model 260 (e.g., accuracy 310, number of parameters 320, efficiency, and/or speed), or a combination thereof The transmitter(s) and/or transceiver(s) of the computing system(s) 290 transmit (send) the optimal trained ML model 260 to the vehicle(s) 217. The receiver(s) and/or transceiver(s) of the vehicle(s) 217 receive the optimal trained ML model 260 from the transmitter(s) of the computing system(s) 290. In response to receiving the optimal trained ML model 260 from the computing system(s) 290, the vehicle(s) 217 can use the optimal trained ML model 260 to make certain decisions (e.g., as in the drive decisioning and drive data collection 215) associated with autonomous or semi-autonomous operation of the vehicle(s) 217 and/or or autonomous or semi-autonomous assistance to the operator of the vehicle(s) 217. Various decision types of decisions may include, for example, decisions regarding whether to cluster a set of points together, decisions regarding whether to recognize a set of sensor data as being a representation of a known object, decisions regarding tracking a path of an object, decisions regarding predicting a path of an object, decisions regarding how to map the environment around the vehicle, decisions regarding how to route the vehicle through the environment, decisions regarding what vehicle controls to actuate (e.g., when the vehicle actuates brakes, an accelerator, steering and/or turning controls, or a combination thereof), or a combination thereof.

The vehicle 217 may, in some examples, replace the previous trained ML model 210 that the vehicle 217 previously used for decisioning for decisions of a certain decision type (e.g., as in the drive decisioning and drive data collection 215) with the optimal trained ML model 260. Thereafter, the vehicle 217 may use the optimal trained ML model 260 for decisioning for decisions of the same decision type (e.g., as in the drive decisioning and drive data collection 215). The optimal trained ML model 260 may, in some examples, be the same as the previous trained ML model 210 that the vehicle 217 previously used for these decisions. In some examples, the vehicle 217 may use a different trained ML model for different types of decisions, such as the different types of decisions listed above and/or in FIG. 4, and the process illustrated in FIG. 2 may be performed separately for the different types of decisions. In some examples, the vehicle 217 can use the same trained ML model for two or more different types of decisions, such as two or more of the different types of decisions listed above.

The previous trained ML model 210, the one-shot trained ML model 230, the candidate DL architectures 240, the selected DL architectures 250, and/or the optimal trained ML model 260 may each be examples of ML models and/or architectures. The previous training 205, the one-shot training 225, the candidate DL architecture generation 235, the candidate evaluation and selection 245, and the TFS training 255 may each be examples of ML techniques (e.g., for training, generation, evaluation, selection, and/or optimization). These ML models and/or architectures may each be trained, generated, evaluated, selected, and/or optimized using these ML techniques. These ML techniques may train, retrain, or optimize based on training data. Training data may include the drive data 220, training data associated with previous ML models (e.g., previous trained ML model 210), various architectures (e.g., candidate DL architectures 240), and/or parameters associated with the vehicle(s) 217. These ML models and/or architectures, and/or ML techniques, may each incorporate, include, and/or use, for instance, one or more neural networks (NNs) (e.g., the NN 600 of FIG. 6), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), or combinations thereof.

The ML model optimization system 200 can perform the process described above and illustrated in FIG. 2 repeatedly as the vehicle(s) 217 continue to train the one-shot trained ML model 230 and/or generate candidate DL architectures 240 as the vehicle 217 continues to gather more drive data 220 (e.g., during drive decisioning and drive data collection 215). In some iterations, which DL architectures of the candidate DL architectures 240 are selected for the selected DL architecture(s) 250 may stay the same, as the newly added candidate DL architecture(s) 240 in such iterations may be sub-optimal and not improve over the previous selected DL architecture(s) 250. In some iterations, which DL architectures of the candidate DL architectures 240 are selected for the selected DL architecture(s) 250 may change, as the new newly added candidate DL architecture(s) 240 in such iterations may end up becoming selected for the selected DL architecture(s) 250.

FIG. 3 is Pareto front graph 300 with evaluations of candidate deep learning (DL) architectures 250. The points graphed on the Pareto front graph 300 of FIG. 3 may each represent evaluated attributes of different candidate DL architectures of the set of candidate DL architectures 250 as evaluated by the computing system(s) 290 during candidate evaluation and selection 245. The points graphed on the Pareto front graph 300 may include a point representing the evaluated attributes of each of the candidate DL architectures 250.

The Pareto front graph 300 includes a vertical axis representing the accuracy 310 of the candidate DL architectures 250 for the decisions to be made using the optimal trained ML model 260. The Pareto front graph 300 includes a horizontal axis representing complexity of the candidate DL architectures 250 (represented by number of parameters 320), which is an important variable for model performance. For instance, lower number of parameters may be an indicator that a candidate DL architecture has a higher speed and/or efficiency. The points representing the evaluations (by the candidate evaluation and selection 245) of the different candidate DL architectures 250 are organized under two arcs—one arc representing one Pareto front 330, the other arc representing another Pareto front 340. The arcs are illustrated using dashed lines and larger points than the remainder of the points in the Pareto front graph 300.

Generally, points closer to the upper-left corner of the Pareto front graph 300 are represent more optimal trained ML models than points that are farther from the upper-left corner of the Pareto front graph 300, since accuracy 310 is maximized in the upper-left corner and number of parameters 320 is minimized upper-left corner. For instance, a candidate DL architecture whose evaluation results in a point close to the upper-left corner of the Pareto front graph 300 is high along the vertical axis representing the accuracy 310 and low on the horizontal axis representing complexity of the trained ML model (represented by number of parameters 320), and therefore have high accuracy and low complexity (and thus high speed). In some examples, during the candidate evaluation and selection 245, the computing system(s) 290 identify the selected DL architecture(s) 250 from the set of candidate DL architectures 240 by selecting the candidate DL architecture(s) whose evaluation(s) result in the point(s) closest to the upper-left corner of the Pareto front graph 300. In some examples, one of the two objectives—accuracy 310 or complexity (represented by number of parameters 320)—may be more important, and thus, during the candidate evaluation and selection 245, the computing system(s) 290 can provide more weight to either accuracy 310 or complexity (represented by number of parameters 320) in selecting the selected DL architecture(s) 250, for instance to prioritize maximizing accuracy 310 over minimizing complexity, or prioritize minimizing complexity over maximizing accuracy 310.

Generally, the points in the Pareto front 340 represent more optimal candidate DL architectures than the points in the Pareto front 330, since the points in the Pareto front 340 are closer to the upper-left corner of the Pareto front graph 300. In some examples, the arc of the Pareto front may gradually move closer to the upper-left corner of the Pareto front graph 300 as more candidate DL architectures 240 are generated by the computing system(s) 290 during candidate DL architecture generation 235 and evaluated by the computing system(s) 290 during candidate evaluation and selection 245. This is because the more candidate DL architectures 240 are generated and evaluated, the higher the probability is of finding a new candidate DL architectures that are more optimal than previously-evaluated candidate DL architectures. In some examples, certain candidate DL architectures that are far enough away from (e.g., more than a threshold distance away from) the Pareto front (e.g., very inaccurate and/or very complex) may be removed and/or pruned from the Pareto front graph 300 entirely to reduce computational complexity of the candidate evaluation and selection 245 process. Thus, in an illustrative example, the Pareto front 330 may represent the state of the Pareto front graph 300 at a relatively early time after a relatively small number of iterations of the process illustrated in FIG. 2, while the Pareto front 340 may represent the state of the Pareto front graph 300 at a later time after a larger number of iterations of the process illustrated in FIG. 2.

An arch shape is illustrated using dotted lines over the Pareto front graph 300 and represents example selected DL architecture(s) 350 that are close to the upper-left corner of the Pareto front graph 300. The example selected DL architecture(s) 350 are examples of the selected DL architecture(s) 250. One particular example selected DL architecture is illustrated as a shaded star, which in some cases may be used as the basis for training and/or generating the optimal trained ML model 260 (e.g., during candidate evaluation and selection 245 and/or TFS training 255).

Figure 4:
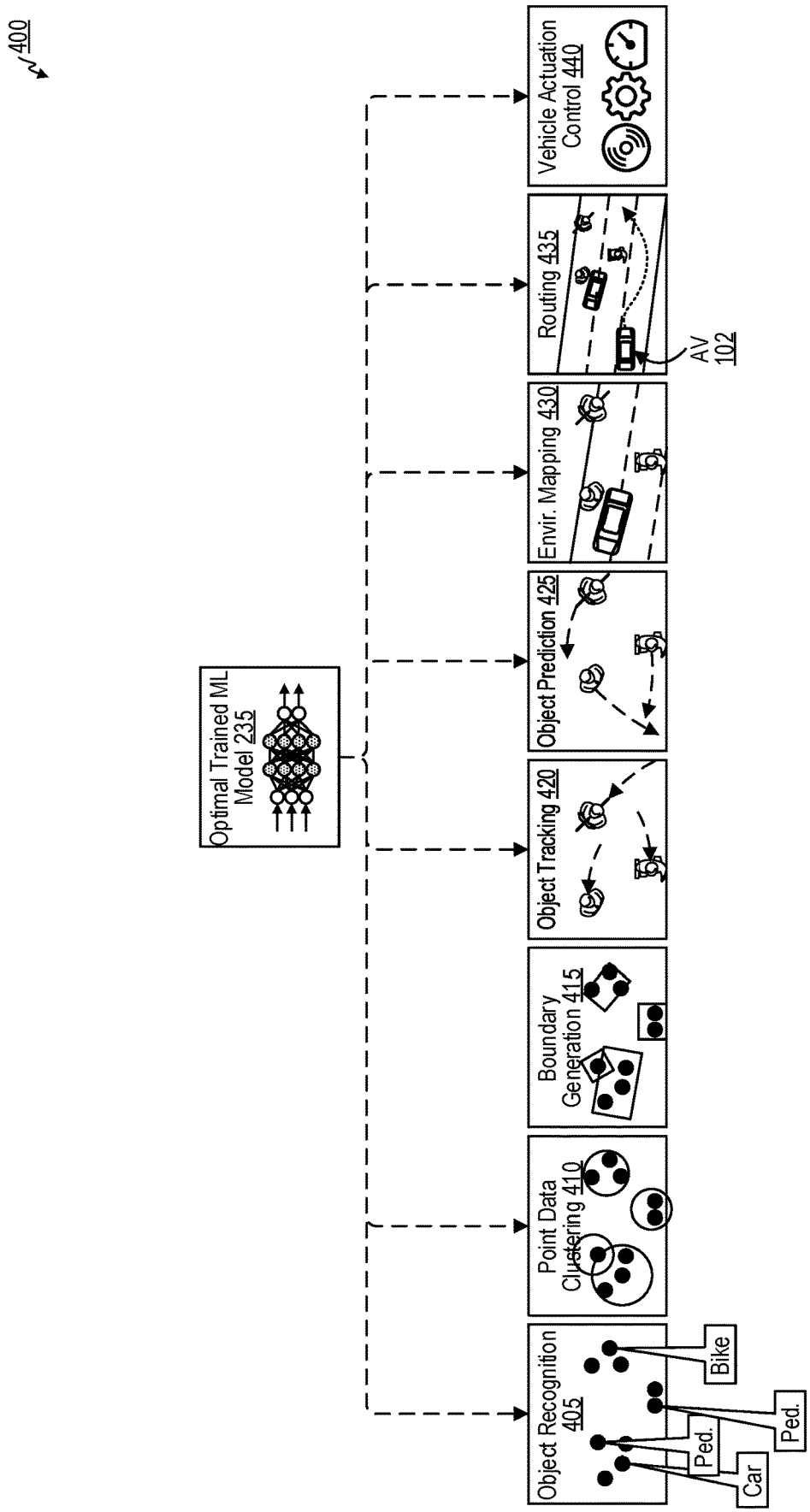
FIG. 4 is a block diagram illustrating examples of processes that can be performed using an optimal trained machine learning (ML) model identified by the ML model optimization system, in accordance with some aspects of the present technology.

FIG. 4 is a block diagram 400 illustrating examples of processes that can be performed using an optimal machine learning (ML) model 260 identified by the ML model optimization system. In some examples, the optimal trained ML model 260 may be used for object recognition 405, for instance to recognize that a particular portion of image data, depth data (e.g., individual points, clusters of points clustered using point data clustering 410, points of point clouds), audio data, or other sensor data represents a particular type of object in the environment. Depth data can include, for example, LIDAR data, RADAR data, SONAR data, SODAR data, ToF sensor data, structured light sensor data, ultrasound sensor data, or a combination thereof. Types of objects recognizable by the object recognition 405 can include, for example pedestrians, bicycles, bicyclists, scooters, scooter operators, motorcycles, motorcyclists, animals (e.g., dogs, cats), cars, trucks, vans, other types of motor vehicles, trees, bushes, grassy areas, other plants, street signs, street lamps, traffic signals, barricades, buildings, flares, potholes, debris, other objects described herein, or combinations thereof. In some examples, object recognition 405 can be based on a combination of image data and depth data. Examples of classification of individual points of depth data using object recognition 405 is illustrated in the box corresponding to object recognition 405 in FIG. 4.

In some examples, the optimal trained ML model 260 may be used for point data clustering 410. Point data can include points of depth data, such as LIDAR data, RADAR data, SONAR data, SODAR data, ToF sensor data, structured light sensor data, ultrasound sensor data, or a combination thereof. The optimal trained ML model 260 can decide to cluster together points that are close together, in some cases based on classification of points in the object recognition 405. Examples of techniques that can be used in point data clustering 410 include density-based spatial clustering of applications with noise (DB SCAN) (e.g., clustering based on distance between nearest points), K-Means clustering (e.g., clustering based on distance between points), affinity propagation (e.g., clustering based on graph distance), mean-shift clustering (e.g., clustering based on distance between points), gaussian mixture clustering (e.g., clustering based on Mahalanobis distance to centers), spectral clustering (e.g., clustering based on graph distance), hierarchical agglomerative clustering (HAC) (e.g., clustering based on a hierarchy of clusters going from the bottom up and merging pairs of clusters as one moves up the hierarchy), hierarchical divisive clustering (HDC) (e.g., clustering based on a hierarchy of clusters going from the top down and splitting up clusters as one moves down the hierarchy), correlation clustering (e.g., clustering based on similarity and/or relationships between points), or a combination thereof. In some examples, the clustering algorithm(s) cluster a set of points together into a cluster based on the points in the set being within a threshold distance of each other, of a centroid, of the nearest points of the set, another distance measure indicated in the list of clustering algorithms above, or a combination thereof. The distance measure may be measured as a Euclidean distance, a Manhattan distance, a Mahalanobis distance, a Minkowski distance, a Hamming distance, a graph distance, cosine distance, a Jaccard distance, or a combination thereof. Examples of encircled clusters of points of depth data that are clustered using the point data clustering 410 are illustrated in the box corresponding to point data clustering 410 in FIG. 4.

In some examples, the optimal trained ML model 260 may be used for boundary generation 415. In some cases, boundary generation 415 can be part of object recognition 405 and/or point data clustering 410. In some examples, boundary generation 415 can be based on, but distinct from, object recognition 405 and/or point data clustering 410. The optimal trained ML model 260 can perform boundary generation 415 to generate boundaries, such as 2D bounding boxes (e.g., rectangles or other polygons) or 3D bounding boxes (e.g., rectangular prisms or other polyhedrons) representing boundaries of objects and/or boundaries that the AV 102 should seek to avoid (which may include a buffer space around the objects to account for sudden changes such as doors opening or other sudden movements and/or shape changes of the objects). Examples of rectangular boundaries around sets of points of depth data corresponding to distinct objects using the boundary generation 415 are illustrated in the box corresponding to boundary generation 415 in FIG. 4.

In some examples, the optimal trained ML model 260 may be used for object tracking 420, for instance using object recognition 405, point clustering 410, and/or boundary generation 415 to recognize a path that a recognized object has moved along through an environment in which the AV 102 is also in. In some cases, the object tracking 420 can also track the path of the AV 102 through the environment. Examples of dashed arrows representing tracked paths of objects determined using object tracking 420 are illustrated in the box corresponding to object tracking 420 in FIG. 4.

In some examples, the optimal trained ML model 260 may be used for object prediction 425, for instance using object recognition 405, point clustering 410, boundary generation 415, and/or object tracking 420 to predict a path that a recognized object will move along through an environment in which the AV 102 is also in. The object prediction 425 can, for instance, predict that the recognized object will continue along a tracked path identified using the object tracking 420. On the other hand, the object prediction 425 can predict that the recognized object will deviate from a tracked path identified using the object tracking 420, for instance to avoid colliding with another object in the environment (e.g., the AV 102 or still another object). In some cases, the object tracking 420 can also predict the path of the AV 102 through the environment. Examples of dashed arrows representing predicted paths of objects determined using object prediction 425 are illustrated in the box corresponding to object prediction 425 in FIG. 4.

In some examples, the optimal trained ML model 260 may be used for environment mapping 430, for instance using object recognition 405, point clustering 410, boundary generation 415, object tracking 420, and/or object prediction 425 to generate a map, or other representation, of the environment and the various objects in the environment, in some cases with tracked paths and/or predicted paths of the objects through the environment. In some cases, the map generated by the environment mapping 430 may include a tracked path of the AV 102 through the environment (e.g., determined using object tracking 420), a predicted path of the AV 102 through the environment (e.g., determined using object prediction 425), and/or a planned path or route of the AV 102 through the environment (e.g., determined using routing 435). An example of a map of an environment, with objects, determined using for environment mapping 430 is illustrated in the box corresponding to for environment mapping 430 in FIG. 4.

In some examples, the optimal trained ML model 260 may be used for routing 435, for instance using object recognition 405, point clustering 410, boundary generation 415, object tracking 420, object prediction 425, and/or environment mapping 430 to generate a route for the AV 102 through the environment. In routing 435, the optimal trained ML model 260 can generate a route that avoids other objects in the environment, for instance based on recognized positions of the objects (e.g., determined using object recognition 405, point clustering 410, boundary generation 415, and/or object tracking 420), based on tracked paths of the objects (e.g., determined using object tracking 420), and/or based on predicted paths of the objects (e.g., determined using object prediction 425). An example of a dashed arrow representing a route for the AV 102 through the environment as determined using routing 435 is illustrated in the box corresponding to routing 435 in FIG. 4.

In some examples, the optimal trained ML model 260 may be used for vehicle actuation control 440, for instance to control autonomous, semi-autonomous, and/or automatic actuation of brakes, an accelerator, steering and/or turning controls, or a combination thereof to guide the AV 102 along the route through the environment. The route is the route may be determined using the routing 435, through the environment mapped using the object recognition 405, point clustering 410, boundary generation 415, object tracking 420, object prediction 425, and/or environment mapping 430. In some examples, the optimal trained ML model 260 may perform vehicle actuation control 440 by controlling when to actuate different vehicle actuators (e.g., brakes, an accelerator, steering and/or turning controls, or a combination thereof), what level extent to actuate the vehicle actuators, when to increase extent of actuation of the vehicle actuators, when to decrease or disable extent of actuation of the vehicle actuators, or a combination thereof. The optimal trained ML model 260 can learn various vehicle maneuvers for the perform vehicle actuation control 440 to cause the AV 102 to best traverse the route, such as accelerating, decelerating, turning, changing lanes, passing, drifting, parking, parallel parking, signaling (e.g., using signal lights), slowing, signaling (e.g., using emergency lights), using emergency brakes, or combinations thereof. A wheel icon, a cog icon, and a speedometer icon are illustrated in the box corresponding to vehicle actuation control 440 in FIG. 4, and represent examples of vehicle actuators to be controlled using the vehicle actuation control 440.

Figure 5:
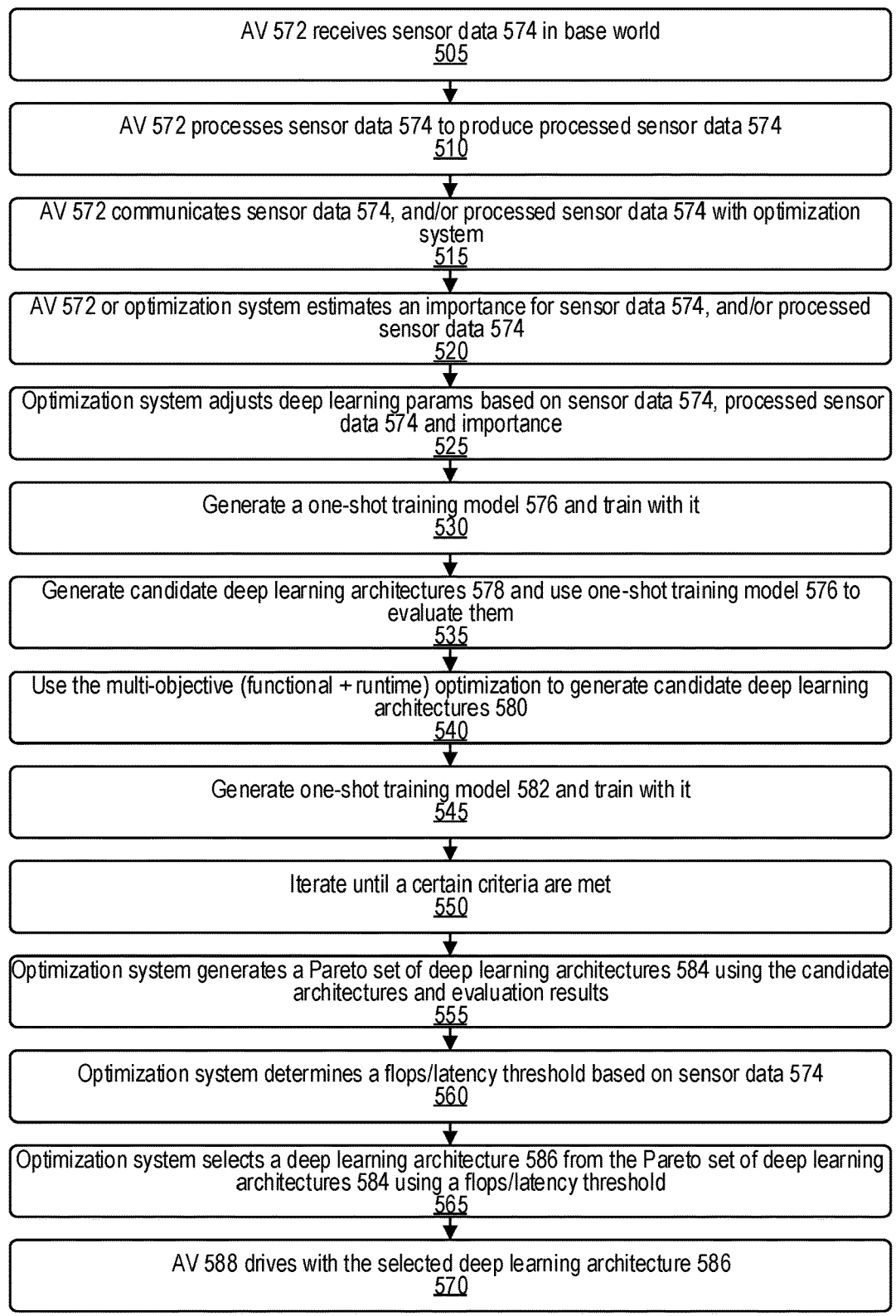
FIG. 5 is a flow diagram illustrating a process for multi-objective Bayesian optimization of one-shot evaluations of candidate deep learning (DL) architectures, in accordance with some aspects of the present technology.

FIG. 5 is a flow diagram illustrating a process 500 for multi-objective Bayesian optimization of one-shot evaluations of candidate deep learning (DL) architectures. The process 500 for machine learning model optimization is performed by an optimization system. The optimization system includes, for instance, the AV 102, the local computing device 110, the sensor systems 104-108, the client computing device 170, the data center 150, the data management platform 152, the AI/ML platform 154, the simulation platform 156, the remote assistant platform 158, the ridesharing platform 160, the ML model optimization system 200, the vehicle(s) 217, the computing system(s) 290, an engine for object recognition 405, an engine for point data clustering 410, an engine for boundary generation 415, an engine for object tracking 420, an engine for object prediction 425, an engine for environment mapping 430, an engine for routing 435, an engine for vehicle actuation control, the neural network 600, the optimization system that performs the process 900, the computing system 1000, the processor 1010, a non-transitory computer readable storage medium having embodied thereon a program that is executable by a processor to perform a method of machine learning model optimization, or a combination thereof.

At operation 505, an AV 572 receives sensor data 574 in the base world (e.g., in the environment that the AV 572 is in). The sensor data 574 can include sensor data captured by sensor(s) of vehicle(s) 217 (e.g., the AV 102), such as the sensor system 1 104, the sensor system 2 106, the sensor system 3 108, the one or more sensors of operation 905, image sensors of cameras, depth sensors, microphones, pose sensors, positioning receivers, vehicle status sensors, any other sensors described herein, or a combination thereof. At operation 510, the AV 572 processes sensor data 574 to produce processed sensor data 574. Processing the sensor data 574 can include, for instance, clustering depth point data, removing outlier data, image processing of image data, identifying correspondences between image data and depth data based on extrinsic calibration, identifying correspondences between different images based on intrinsic and/or extrinsic calibration, identifying correspondences between different depth data based on intrinsic and/or extrinsic calibration. At operation 515, the AV 572 communicates sensor data 574, and/or processed sensor data 574, to the optimization system, for instance to the receiver(s) of the computing system(s) 290. The drive data 220 of FIG. 2 can include the sensor data 574 and/or the processed sensor data 574. Operations 505 and/or 510 can include the drive decisioning and drive data collection 215 of FIG. 2. The drive decisioning and drive data collection 215 can include operations 505 and/or 510.

At operation 520, the optimization system (and/or the AV 572) estimates an importance for sensor data 574, and/or processed sensor data 574. At operation 525, the optimization system adjusts deep learning parameters (e.g., parameters of the computing system(s) 290 and/or the vehicle(s) 217, and/or the one-shot training model 576) based on sensor data 574, processed sensor data 574 and importance.

At operation 530, the optimization system generates a one-shot training model 576 (e.g., one-shot trained ML model 230) and trains with it (e.g., using the computing system(s) 290 performing the one-shot training 225). At operation 535, the optimization system generates candidate deep learning architectures 578 (e.g., candidate DL architectures 240) and uses the one-shot training model 576 to evaluate them (e.g., using the computing system(s) 290 performing the candidate DL architecture generation 235).

At operation 540, the optimization system uses multi-objective optimization to generate candidate deep learning architectures 580 (e.g., candidate DL architectures 240). In some examples, multi-objective optimization comprises functional evaluation and/or runtime evaluation. Criteria for the multi-objective optimization may include number of iterations, run-time performance, and/or functional performance. At operation 545, the optimization system generates a one-shot training model 582 (e.g., one-shot trained ML model 230) and trains with it (e.g., using the computing system(s) 290 performing one-shot training 225). At operation 550, the optimization system iterates (e.g., repeating any combination of operation(s) 505-550) until a certain criteria are met (e.g., sufficient candidate DL architectures to select from, sufficient candidate DL architectures to generate a Pareto front, sufficient candidate DL architectures to exceed an amount threshold, sufficient candidate DL architectures exceeding a minimum threshold for accuracy 310, sufficient candidate DL architectures below a maximum threshold for complexity (e.g., measured in number of parameters 320), or a combination thereof).

At operation 555, the optimization system (e.g., the computing system(s) 290 performing candidate evaluation and selection 245) generates a Pareto set of deep learning architectures 584 (e.g., Pareto graph 300) using the candidate architectures (e.g., candidate DL architectures 240) and evaluation results. At operation 560, the optimization system (e.g., the computing system(s) 290 performing candidate evaluation and selection 245) determines a flops/latency threshold based on sensor data 574. In some examples, the determination of the flops/latency threshold is based on latency violations. In some examples, flops/latency threshold is selected based on optimization of vehicle safety, vehicle comfort, vehicle safety metrics, vehicle comfort metrics, or any combination of these. The vehicle safety and comfort metrics can be indicators of safety and comfort which are derived from tests using past or simulated AV data. In some examples, flops/latency threshold is selected as the smallest value that meets an accuracy criterion. In some examples, flops/latency threshold is selected as the smallest value that meets a probability of latency violations. For example, flops/latency threshold may be selected as the value that produces latency violations every 10 miles of driving in city environment. At operation 565, the optimization system (e.g., the computing system(s) 290 performing candidate evaluation and selection 245) selects a deep learning architecture (e.g., selected DL architecture(s) 250) from the Pareto set of deep learning architectures 584 using a flops/latency threshold. Examples of the Pareto set of deep learning architectures 584 include the Pareto front 330, the Pareto front 340, and/or the points of the Pareto front graph 300. At operation 570, the optimization system sends the selected deep learning architecture 586, and the AV 588 drives with the selected deep learning architecture 586. Examples of the selected deep learning architecture 586 include the optimal trained ML model 260, example selected candidate DL architecture(s) 350, the optimal trained ML model of operations 915-920, or a combination thereof.

Figure 6:
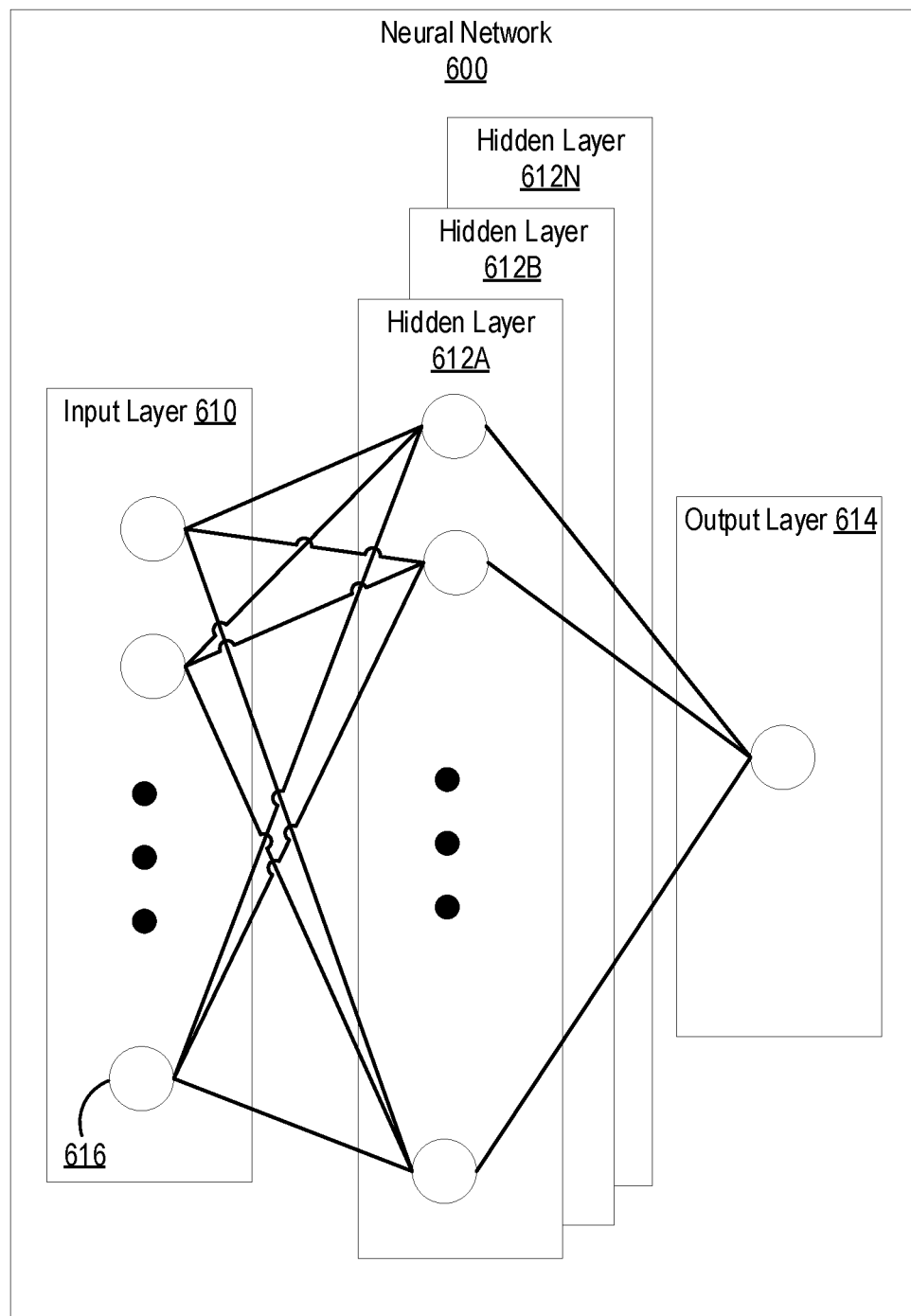
FIG. 6 is a block diagram illustrating an example of a neural network that can be used for environment analysis, in accordance with some examples.

FIG. 6 is a block diagram illustrating an example of a neural network (NN) 600 that can be used is for environment analysis. The neural network 600 can include any type of deep network, such as a convolutional neural network (CNN), an autoencoder, a deep belief net (DBN), a Recurrent Neural Network (RNN), a Generative Adversarial Networks (GAN), and/or other type of neural network. In some examples, the NN 600 may be an example of system(s) associated with the previous training 205, the previous trained ML model 210, the one-shot training 225, the one-shot trained ML model 230, the candidate DL architecture generation 235, the candidate DL architectures 240, the candidate evaluation and selection 245, the selected DL architectures 250, the TFS training 255, the optimal trained ML model 260, the example selected DL architecture(s) 350, the candidate DL architectures in the Pareto front 330, the candidate DL architectures in the Pareto front 340, a trained ML model for object recognition 405, a trained ML model for point data clustering 410, a trained ML model for boundary generation 415, a trained ML model for object tracking 420, a trained ML model for object prediction 425, a trained ML model for environment mapping 430, a trained ML model for routing 435, a trained ML model for vehicle actuation control 440, the one-shot training model 576, the candidate deep learning architectures 578, the candidate deep learning architectures 580, the one-shot training model 582, the Pareto set of deep learning architectures 584, the selected deep learning architecture 586, the architecture 705, another architecture or model trained and/or evaluated using the one-shot system of FIG. 7 and/or FIG. 8, the first trained ML model of operation 905, the second trained ML model of operation 910, the plurality of trained ML models of operation 915, the optimal trained ML model of operations 915-920, a ML system operating on the computing system 1000, another ML model described herein, another ML system described herein, or a combination thereof An input layer 610 of the neural network 600 includes input data. The input data of the input layer 610 can include sensor data (or features thereof) captured by one or more sensor(s) of vehicle(s) 217 (e.g., the AV 102), such as the sensor system 1 104, the sensor system 2 106, the sensor system 3 108, the one or more sensors of operation 905, image sensors of cameras, depth sensors, microphones, pose sensors, positioning receivers, vehicle status sensors, any other sensors described herein, or a combination thereof. The input data of the input layer 610 can include the drive data 220. The input data of the input layer 610 can include decision(s) made by other ML model(s) of the vehicle regarding, for instance, object recognition 405, point clustering 410, boundary generation 415, object tracking 420, object prediction 425, environment mapping 430, routing 435, and/or vehicle actuation control 440.

The neural network 600 includes multiple hidden layers 612A, 612B, through 612N. The hidden layers 612A, 612B, through 612N include "N" number of hidden layers, where "N" is an integer greater than or equal to one. The number of hidden layers can be made to include as many layers as needed for the given application. The neural network 600 further includes an output layer 614 that provides an output resulting from the processing performed by the hidden layers 612A, 612B, through 612N.

In some examples, the output layer 614 can include decision(s) made regarding aspects of environment analysis and/or control of the AV 102, such as object recognition 405, point clustering 410, boundary generation 415, object tracking 420, object prediction 425, environment mapping 430, routing 435, and/or vehicle actuation control 440. In some examples, the output layer 614 can provide semantic segmentation of points of depth data (e.g., as in the object reception 405), object recognition in image data and/or depth data (e.g., as in the object reception 405), clustering of sets of points of depth data (e.g., as in the point data clustering 410), boundaries for sets of points of depth data (e.g., as in the boundary generation 415), tracked path(s) for one or more objects (e.g., as in the object tracking 420), predicted path(s) for one or more objects (e.g., as in the object prediction 425), a map of the environment around the AV 102 (e.g., as in the environment mapping 430), a route for the AV 102 to traverse the environment and/or avoid objects within the environment (e.g., as in the routing 435), vehicle actuation control signals (e.g., as in the vehicle actuation control 440), or a combination thereof.

The neural network 600 is a multi-layer neural network of interconnected filters. Each filter can be trained to learn a feature representative of the input data. Information associated with the filters is shared among the different layers and each layer includes information as information is processed. In some cases, the neural network 600 can include a feed-forward network, in which case there are no feedback connections where outputs of the network are fed back into itself. In some cases, the network 600 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 610 can activate a set of nodes in the first hidden layer 612A. For example, as shown, each of the input nodes of the input layer 610 can be connected to each of the nodes of the first hidden layer 612A. The nodes of a hidden layer can transform the information of each input node by applying activation functions (e.g., filters) to this information. The information derived from the transformation can then be passed to and can activate the nodes of the next hidden layer 612B, which can perform their own designated functions. Example functions include convolutional functions, downscaling, upscaling, data transformation, and/or any other suitable functions. The output of the hidden layer 612B can then activate nodes of the next hidden layer, and so on. The output of the last hidden layer 612N can activate one or more nodes of the output layer 614, which provides a processed output image. In some cases, while nodes (e.g., node 616) in the neural network 600 are shown as having multiple output lines, a node has a single output and all lines shown as being output from a node represent the same output value.

In some cases, each node or interconnection between nodes can have a weight that is a set of parameters derived from the training of the neural network 600. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 610 using the different hidden layers 612A, 612B, through 612N in order to provide the output through the output layer 614.

Figure 7:
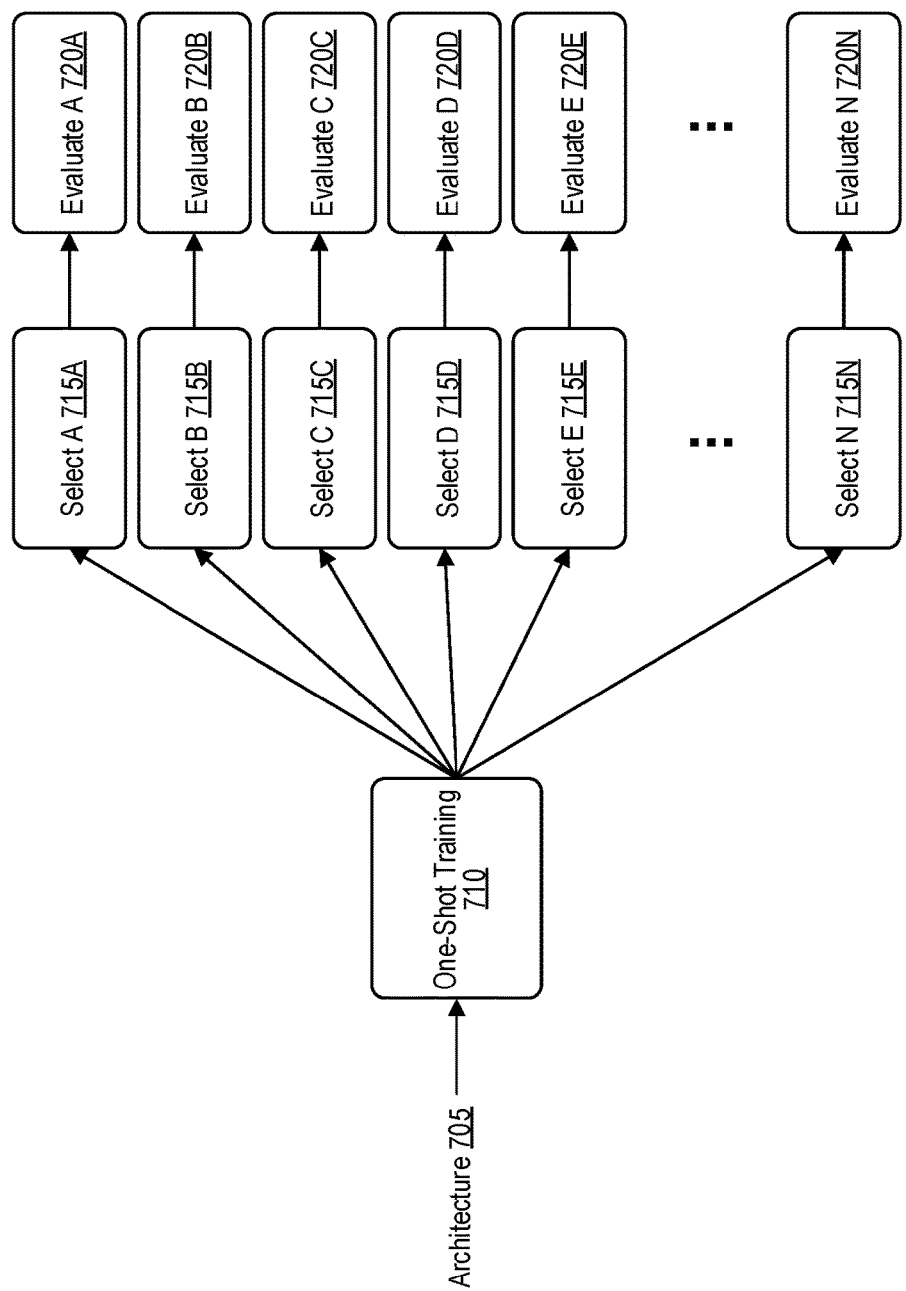
FIG. 7 is a block diagram illustrating an example of a one-shot training and evaluation process, in accordance with some examples.

FIG. 7 is a block diagram 700 illustrating an example of a one-shot training and evaluation process. The one-shot training and evaluation process of FIG. 7 may be performed by a one-shot system that can include, for instance, the previous training 205, the drive decisioning and drive data collection 215, the one-shot training 225, the candidate DL architecture generation 235s, the candidate evaluation and selection 245, the TFS training 255, or a combination thereof. During the one-shot training and evaluation process of FIG. 7, the one-shot system trains and evaluates an architecture 705, which may include one or more ML models (e.g., NN 600). The one-shot training and evaluation process of FIG. 7 includes the one-shot system performing one-shot training 710, during which the one-shot system makes various selections of channels to operate and channels to prune. These selections are illustrated in FIG. 7 as including selection A 715A, selection B 715B, selection C 715C, selection D 715D, selection E 715E, all the way up to selection N 715N. Examples of the one-shot training 710 and the selections 715A-715N made using connected channels in batches (e.g., batch 810, batch 820, batch 830, and batch 840) are illustrated in FIG. 8.

Because training is more expensive than evaluation (e.g., sometimes by a factor of about a thousand), this type of one-shot approach offers a benefit in that it allows a single training and numerous rounds of evaluation, rather than numerous rounds of training, which would be significantly costlier.

Figure 8:
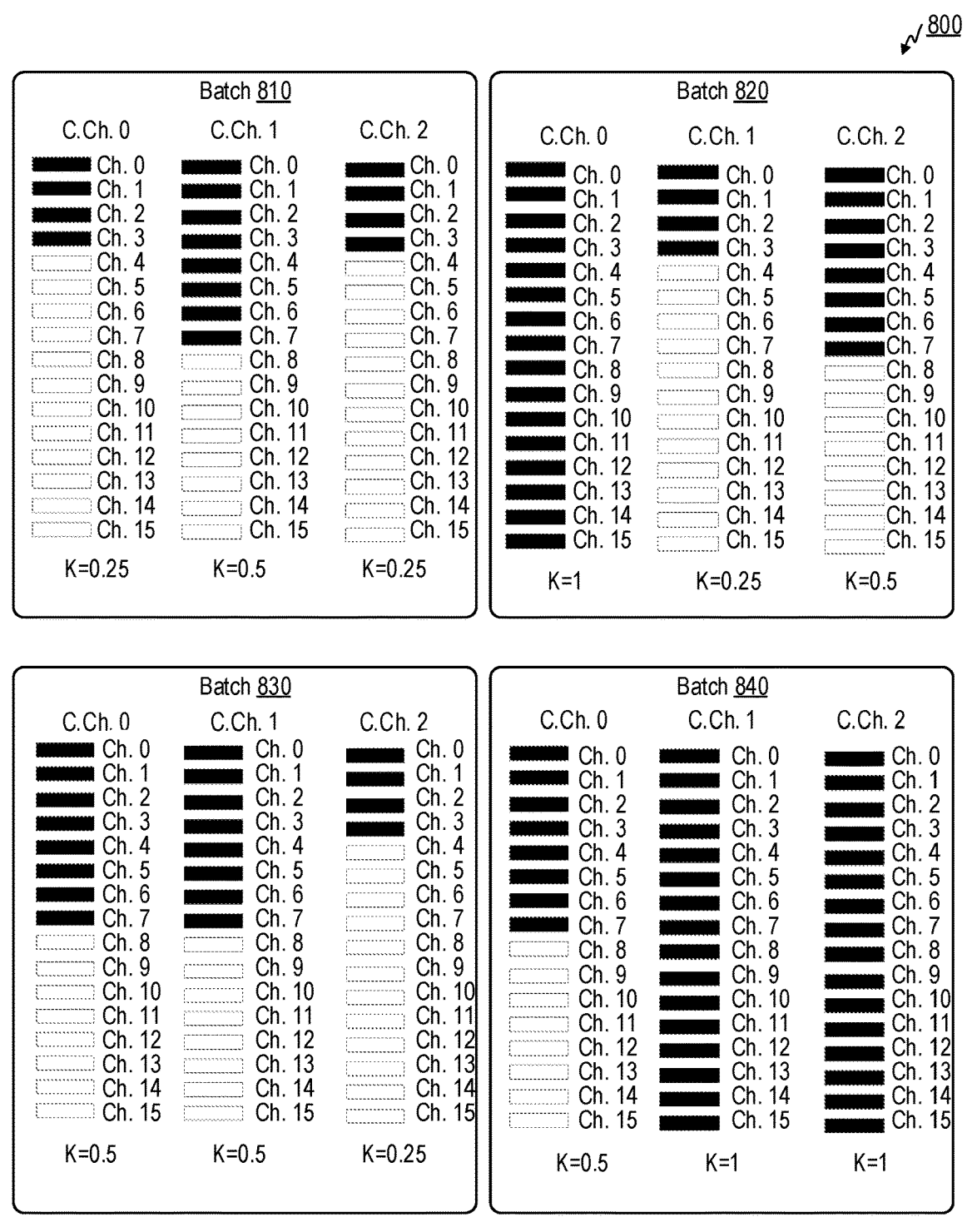

FIG. 8 is a block diagram 800 illustrating an example of training a base model for one-shot evaluations over four batches of data. Referring back to FIG. 7, the one-shot training 710 and selections 715A-715N group the architecture 705 or model into units to be pruned together. These units may be referred to as connected channels, abbreviated as "C.Ch." in in FIG. 8. In some example, these units may be the smallest atomic unit to be pruned together.

Four batches are illustrated in FIG. 8, including a batch 810, a batch 820, a batch 830, and a batch 840. Each batch represents a subset of data points of training data that the architecture 705 is being trained using. The example architecture 705 or model includes three connected channels, labeled as connected channel 0 ("C.Ch.0"), connected channel 1 ("C.Ch.1"), and connected channel 2 ("C.Ch.2"), respectively. Each connected channel includes 16 channels numbered from 0 to 15, labeled in FIG. 8 as "Ch. 0," "Ch. 1," "Ch. 2," and so forth, up to "Ch. 15." For each batch in training, the one-shot system stochastically selects a pruning level for each connected channel (e.g., independently). The pruning level is indicated in FIG. 8 by a value for the variable K. For instance, where K=1, the one-shot system performs no pruning of the channels (channels 0 through 15) of the respective connected channel. On the other hand, where K=0.25, the one-shot system performs aggressive pruning of the channels (channels 0 through 15) of the respective connected channel. During training, the one-shot system can select a pruning mask (e.g., the value for K) for each connected channel. In some examples, the one-shot system can select a pruning mask (e.g., the value for K) randomly for one or more of the connected channels during training.

For the batches illustrated in FIG. 8, black-filled rectangles represent channels that are operating functionally, while white-filled rectangles represent channels that are pruned (e.g., zeroed out) by the one-shot system. For instance, in batch 810, the one-shot system selects an aggressive pruning mask (K=0.25) for connected channel 0, selects a less aggressive pruning mask (K=0.5) for connected channel 1, and again selects an aggressive pruning mask (K=0.25) for connected channel 2. In batch 820, the one-shot system selects a non-pruning mask (K=1) for connected channel 0, selects an aggressive pruning mask (K=0.25) for connected channel 1, and selects a less aggressive pruning mask (K=0.25) for connected channel 2. In batch 830, the one-shot system selects a less aggressive pruning mask (K=0.5) for connected channel 0, selects a less aggressive pruning mask (K=0.5) for connected channel 1, and selects an aggressive pruning mask (K=0.25) for connected channel 2. In batch 840, the one-shot system selects a less aggressive pruning mask (K=0.5) for connected channel 0, selects a non-pruning mask (K=1) for connected channel 1, and again selects a non-pruning mask (K=1) for connected channel 2.

The training results in a trained model that is trained to run with varying subsets of its channels, which can be referred to as a one-shot training model. Examples of the one-shot training model can include the Examples of the one-shot trained ML model include one-shot trained ML model 230, the one-shot training model 576, the one-shot training model 582, the NN 600, the architecture 705, another architecture or model trained and/or evaluated using the one-shot system of FIG. 7 and/or FIG. 8, the one-shot trained ML model of operations 910-915, a ML model operating on the computing system 1000, another ML model described herein, or a combination thereof. In some examples, generation of the one-shot trained ML model is performed using the one-shot training 225. system operating on the computing system 1000, another ML model described herein, another ML system described herein, or a combination thereof Referring back to FIG. 7, the one-shot training and evaluation process of FIG. 7 includes evaluations. The evaluations of FIG. 7 include evaluation A 720A, evaluation B 720B, evaluation C 720C, evaluation D 720D, evaluation E 720E, all the way up to evaluation N 720N. The evaluations 720A-720N evaluate architectures/models (e.g., the architecture 705) by fixing the pruning configuration (e.g., as indicated by K) applied to each connected channel for the entire evaluation dataset. This constitutes the evaluation of one candidate architecture. As noted above, a production model may have more than a thousand trillion candidate architectures to consider, which may be difficult or infeasible to exhaustively search. To produce a faster result, the one-shot system can use a multi-objective optimizer to balance off the runtime for the model versus accuracy, for instance as discussed with respect to identifying the optimal trained ML model 260, example selected candidate DL architecture(s) 350, the selected deep learning architecture 586, the NN 600, the optimal trained ML model of operations 915-920, or a combination thereof.

Figure 9:
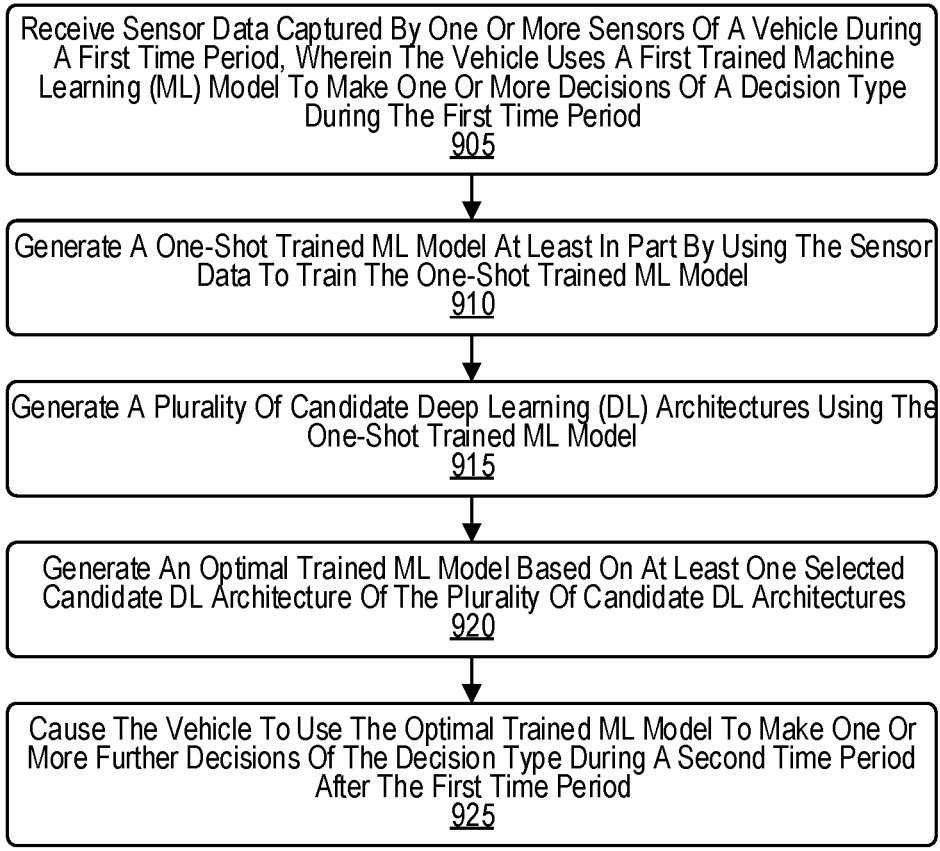
FIG. 9 is a flow diagram illustrating a process for machine learning model optimization, in accordance with some examples.

FIG. 9 is a flow diagram illustrating a process 900 for machine learning model optimization. The process 900 for machine learning model optimization is performed by an optimization system. The optimization system includes, for instance, the AV 102, the local computing device 110, the sensor systems 104-108, the client computing device 170, the data center 150, the data management platform 152, the AI/ML platform 154, the simulation platform 156, the remote assistant platform 158, the ridesharing platform 160, the ML model optimization system 200, the vehicle(s) 217, the computing system(s) 290, the previous training 205, the drive decisioning and drive data collection 215, the one-shot training 225, the candidate DL architecture generation 235s, the candidate evaluation and selection 245, the TFS training 255, an engine for object recognition 405, an engine for point data clustering 410, an engine for boundary generation 415, an engine for object tracking 420, an engine for object prediction 425, an engine for environment mapping 430, an engine for routing 435, an engine for vehicle actuation control 440, the optimization system that performs the process 500, the neural network 600, the architecture 705, the one-shot system of FIG. 7, the one-shot system of FIG. 8, the computing system 1000, the processor 1010, a non-transitory computer readable storage medium having embodied thereon a program that is executable by a processor to perform a method of machine learning model optimization, or a combination thereof.

At operation 905, the optimization system is configured to, and can, receive sensor data captured by one or more sensors of a vehicle during a first time period. The vehicle uses a first trained machine learning (ML) model for one or more decisions of a decision type during the first time period. Examples of the vehicle include the AV 102 and the vehicle(s) 217. Examples of the first trained ML model include the previous trained ML model 210, a model based on one of the candidate DL architectures in the Pareto front 330, a model based on one of the candidate DL architectures in the Pareto front 340, a trained ML model for object recognition 405, a trained ML model for point data clustering 410, a trained ML model for boundary generation 415, a trained ML model for object tracking 420, a trained ML model for object prediction 425, a trained ML model for environment mapping 430, a trained ML model for routing 435, a trained ML model for vehicle actuation control 440, a trained ML model used in operation 510 to process the sensor data 574 to produce the processed sensor data 574, a trained ML model used in operation 520 to estimate importance, the NN 600, the architecture 705, another architecture or model trained and/or evaluated using the one-shot system of FIG. 7 and/or FIG. 8, a ML model operating on the computing system 1000, another ML model described herein, or a combination thereof. Examples of the decision type includes object recognition 405, point data clustering 410, boundary generation 415, object tracking 420, object prediction 425, environment mapping 430, routing 435, vehicle actuation control 440, other decision types described herein, or a combination thereof.

Examples of the one or more sensors include sensor data captured by sensor systems 104, 106, and 108 of the AV 102. The sensor data of the drive data 220 can include sensor data captured by one or more image sensors (e.g., of one or more cameras), one or more depth sensors, one or more microphones, one or more pose sensors, one or more vehicle status sensors, or a combination thereof. The depth sensor(s) can include, for instance, LIDAR sensor(s), pseudo-LIDAR sensor(s), RADAR sensor(s), SONAR sensor(s), SODAR sensor(s), ultrasonic sensor(s), laser rangefinder(s), ToF sensor(s), structured light sensor(s), or combinations thereof. The pose sensor(s) can include, for instance, inertial measurement unit(s), gyroscope(s), gyrometer(s), accelerometer(s), altimeter(s), barometer(s), positioning receiver(s), or combinations thereof. The positioning receiver(s) can include, for instance, GNSS receiver(s), GPS receiver(s), altimeter(s), barometer(s), Wi-Fi transceivers, cellular network transceivers, wireless local area network (WLAN) transceivers, Bluetooth transceivers, beacon transceivers, personal area network (PAN) transceivers, municipal area network (MAN) transceivers, wide area network (WAN) transceivers, communication interface(s) 1040, or combinations thereof. The vehicle status sensor(s), such as engine sensor(s), speedometer(s), tachometer(s), odometer(s), altimeter(s), tilt sensor(s), impact sensor(s), airbag sensor(s), seat occupancy sensor(s), open/closed door sensor(s), on/off light sensor(s), tire pressure sensor(s), rain sensor(s), or combinations thereof.

In some examples, the one or more sensors of the vehicle include an image sensor of a camera, and the sensor data includes image data captured by the image sensor. In some examples, the one or more sensors of the vehicle include a depth sensor, and the sensor data includes depth data captured by the depth sensor. In some examples, the one or more sensors of the vehicle include a pose sensor, and the sensor data includes pose data captured by the pose sensor. In some examples, operation 905 includes operations 505, 510, 515, 520, and/or 525.

In some examples, the optimization system is configured to, and can, train the first trained ML model before operation 905, for instance using the previous training 205.

At operation 910, the optimization system is configured to, and can, generate a one-shot trained ML model at least in part by using the sensor data to train the one-shot trained ML model. Examples of the one-shot trained ML model include one-shot trained ML model 230, the one-shot training model 576, the one-shot training model 582, the NN 600, the architecture 705, another architecture or model trained and/or evaluated using the one-shot system of FIG. 7 and/or FIG. 8, a ML model operating on the computing system 1000, another ML model described herein, or a combination thereof. In some examples, generation of the one-shot trained ML model in operation 910 is performed using the one-shot training 225. In some examples, the sensor data of operations 905 and 910 includes, and/or is part of, the drive data 220. In some examples, operation 910 includes operations 520, 525, and/or 530. In some examples, the sensor data of operations 905 and 910 includes, and/or is part of, the sensor data 574 and/or the processed sensor data 574.

At operation 915, the optimization system is configured to, and can, generate a plurality of candidate deep learning (DL) architectures using the one-shot trained ML model. Examples of the plurality of candidate deep learning (DL) architectures include the candidate DL architectures 240, the selected DL architectures 250, the example candidate DL architecture(s) 350, the candidate DL architectures in the Pareto front 330, the candidate DL architectures in the Pareto front 340, the candidate deep learning architectures 578, the candidate deep learning architectures 580, the Pareto set of deep learning architectures 584, the selected deep learning architecture 584, a candidate DL architecture operating on the computing system 1000, another candidate DL architecture described herein, or a combination thereof. In some examples, generation of the candidate DL architectures in operation 915 is performed using the candidate DL architecture generation 235. In some examples, operation 915 includes operations 535, 540, 545, 550, 555, and/or 560.

At operation 920, the optimization system is configured to, and can, generate an optimal trained ML model based on at least one selected candidate DL architecture of the plurality of candidate DL architectures. The plurality of candidate DL architectures includes the at least one selected candidate DL architecture. In some examples, the optimal trained ML model includes the at least one selected candidate DL architecture, in some cases with parameters applied associated with the vehicle. In some examples, the optimal trained ML model is distinct from the first trained ML model.

Examples of the at least one selected candidate DL architecture include at least one selection from the candidate DL architectures 240, the selected DL architecture(s) 250, the example candidate DL architecture(s) 350, at least one selection from the candidate DL architectures in the Pareto front 330 (e.g., along the upper edge and/or left edge), at least one selection from the candidate DL architectures in the Pareto front 340 (e.g., along the upper edge and/or left edge), at least one selection from the candidate deep learning architectures 578, at least one selection from the candidate deep learning architectures 580, at least one selection from the Pareto set of deep learning architectures 584, the selected deep learning architecture 584, a selected DL architecture operating on the computing system 1000, another selected DL architecture described herein, or a combination thereof. In some examples, selection of the at least one selected candidate DL architecture in operation 920 is performed using the candidate evaluation and selection 245. In some examples, operation 915 includes operations 535, 540, 545, 550, 555, and/or 560.

Examples of the optimal trained ML model include the optimal trained ML model 260, an optimal trained ML model based on the example selected DL architectures 350, an optimal trained ML model based on the DL architectures in the Pareto front 330, an optimal trained ML model based on the DL architectures in the Pareto front 340, a trained ML model for object recognition 405, a trained ML model for point data clustering 410, a trained ML model for boundary generation 415, a trained ML model for object tracking 420, a trained ML model for object prediction 425, a trained ML model for environment mapping 430, a trained ML model for routing 435, a trained ML model for vehicle actuation control 440, the selected deep learning architecture 584, a ML model operating on the computing system 1000, another ML model described herein, or a combination thereof.

In some examples, the plurality of candidate DL architectures form a Pareto front, and generating the optimal trained ML model based on the at least one selected candidate DL architecture includes selecting the at least one selected candidate DL architecture from the plurality of candidate DL architectures based on Pareto optimality corresponding to the Pareto front. Examples of the Pareto front include the Pareto front 330 and the Pareto front 340. Examples of identifying the optimal trained ML model based on Pareto optimality corresponding to the Pareto front include identification of an optimal trained ML model that corresponds to the example selected DL architecture 350 based on Pareto optimality (e.g., based on being in the upper-left of the Pareto front graph 300) corresponding to the Pareto front 330. In some examples, Pareto optimality can be weighted more toward optimizing accuracy 310 than speed (e.g., where speed has an inverse relationship to complexity, for instance as measured in number of parameters 320).

In some examples, to generate the optimal trained ML model based on the at least one selected candidate DL architecture, the optimization system is configured to train the optimal trained ML model from scratch, for instance using TFS training 255. In some examples, to generate the optimal trained ML model based on the at least one selected candidate DL architecture, the optimization system is configured to optimize the optimal trained ML model using one-shot pruning as discussed with respect to FIGS. 2, 3, 5, 7, and 8.

In some examples, to generate the optimal trained ML model based on the at least one selected candidate DL architecture, the optimization system is configured to generate the optimal trained ML model based also on one or more parameters of the vehicle.

At operation 925, the optimization system is configured to, and can, cause the vehicle to use the optimal trained ML model to make one or more further decisions of the decision type during a second time period after the first time period. In some examples, operation 920 includes operations 565 and/or 570.

In some examples, the decision type is associated with object recognition of an object (other than the vehicle) in the environment, for instance as in the object recognition 405. In some examples, the decision type is associated with tracking movement of an object (other than the vehicle) in the environment, for instance as in the object tracking 420. In some examples, the decision type is associated with prediction of movement of an object (other than the vehicle) in the environment, for instance as in the object prediction 425. In some examples, the decision type is associated with mapping the environment that the vehicle (and one or more other objects) are positioned within, for instance as in the boundary generation 415 and/or the environment mapping 430. In some examples, the decision type is associated with generating a route for the vehicle to traverse through the environment that the vehicle (and one or more other objects) are positioned within, for instance as in the routing 435 and/or the vehicle actuation control 440. In some examples, the optimization system is configured to, and can, cause the vehicle to actuate one or more actuators of the vehicle (e.g., accelerator(s), brake(s), steering mechanism(s), turning mechanism(s)) to autonomously traverse the route, for instance as in the vehicle actuation control 440. In some examples, the decision type is associated with control over one or more actuators of the vehicle (e.g., accelerator(s), brake(s), steering mechanism(s), turning mechanism(s)) that control movement of the vehicle throughout the environment that includes the vehicle and/or one or more other objects.

In some examples, causing the vehicle to use the optimal trained ML model for one or more further decisions of the decision type during the second time period includes transmitting the optimal trained ML model to the vehicle, for instance as in transmission of the optimal trained ML model 260 to the vehicle(s) 217 using the transmitter(s) of the computing system(s) 290, through one or more wireless and/or wired communication(s).

In some examples, the optimization system is configured to, and can, cause the vehicle to use the optimal trained ML model for a decision of a second decision type during the second time period. The second decision type is distinct from the decision type. Examples of the second decision type include any of the above-listed examples of the decision type.

In some examples, the optimization system is configured to, and can, cause the vehicle to determine that the optimal trained ML model is more optimal than the first trained ML model for the decision type. In some examples, the optimization system is configured to, and can, cause the vehicle to use the optimal trained ML model to make the one or more further decisions of the decision type during the second time period (as in operation 925) based on the determination that the optimal trained ML model is more optimal than the first trained ML model for the decision type.

In some examples, the optimal trained ML model is more accurate (e.g. higher accuracy 310) than the first trained ML model for the decision type. In some examples, the optimization system is configured to, and can, cause the vehicle to determine that the optimal trained ML model is more accurate than the first trained ML model for the decision type. In some examples, the optimization system is configured to, and can, cause the vehicle to use the optimal trained ML model to make the one or more further decisions of the decision type during the second time period (as in operation 925) based on the determination that the optimal trained ML model is more accurate than the first trained ML model for the decision type.

In some examples, the optimal trained ML model is faster and/or more efficient (e.g., less complex, for instance as measured in number of parameters 320) than the first trained ML model for the decision type. In some examples, the optimization system is configured to, and can, cause the vehicle to determine that the optimal trained ML model is faster and/or more efficient than the first trained ML model for the decision type. In some examples, the optimization system is configured to, and can, cause the vehicle to use the optimal trained ML model to make the one or more further decisions of the decision type during the second time period (as in operation 925) based on the determination that the optimal trained ML model is faster and/or more efficient than the first trained ML model for the decision type.

Figure 10:
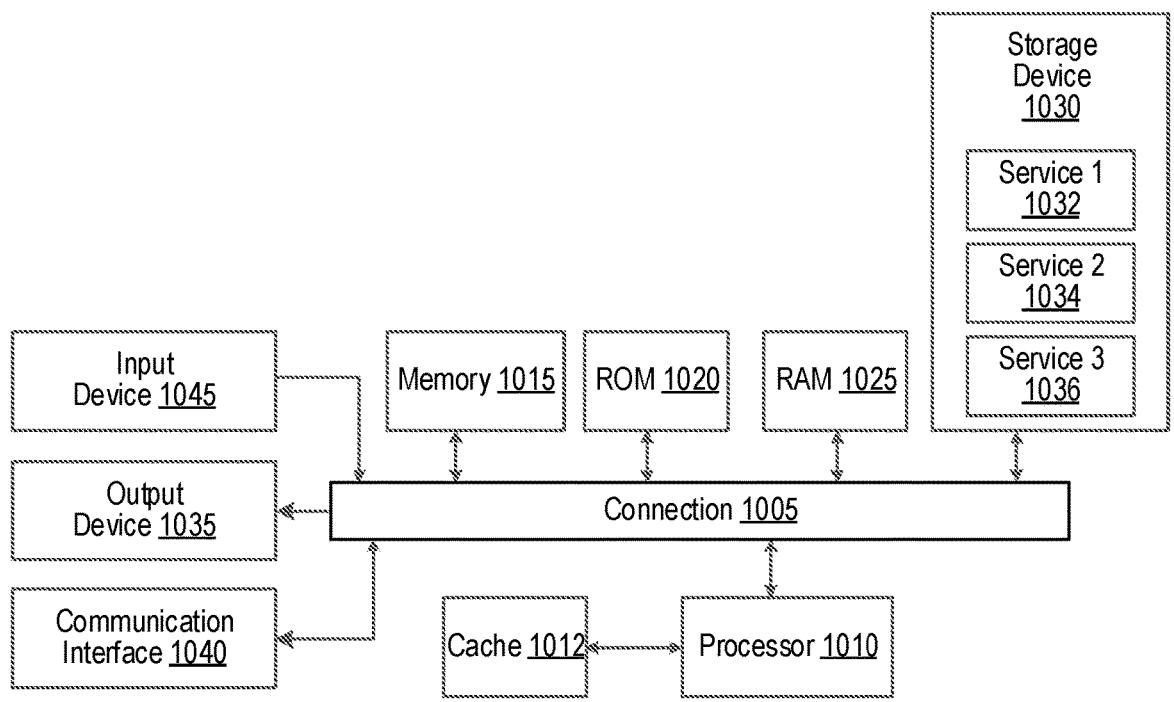
FIG. 10 shows an example of a system for implementing certain aspects of the present technology.

FIG. 10 shows an example of computing system 1000, which can be for example any computing device making up the AV 102, the local computing device 110, the sensor systems 104-108, the client computing device 170, the data center 150, the data management platform 152, the AI/ML platform 154, the simulation platform 156, the remote assistant platform 158, the ridesharing platform 160, the ML model optimization system 200, the vehicle(s) 217, the computing system(s) 290, an engine for object recognition 405, an engine for point data clustering 410, an engine for boundary generation 415, an engine for object tracking 420, an engine for object prediction 425, an engine for environment mapping 430, an engine for routing 435, an engine for vehicle actuation control 440, the optimization system that performs the process 500, the neural network 600, the optimization system that performs the process 900, a non-transitory computer readable storage medium having embodied thereon a program that is executable by a processor to perform a method of machine learning model optimization, any combination thereof, or any component thereof in which the components of the system are in communication with each other using connection 1005. Connection 1005 can be a physical connection via a bus, or a direct connection into processor 1010, such as in a chipset architecture. Connection 1005 can also be a virtual connection, networked connection, or logical connection.

In some embodiments, computing system 1000 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1000 includes at least one processing unit (CPU or processor) 1010 and connection 1005 that couples various system components including system memory 1015, such as read-only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 1002.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1040 may also include one or more Global Navigation Satellite System (GNSS) receivers or transceivers that are used to determine a location of the computing system 1000 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1030 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/Re-RAM), phase change memory (PCM), spin transfer torque RAM (STT-RAM), another memory chip or cartridge, and/or a combination thereof.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

What is claimed is:

1. A system for machine learning model optimization, the system comprising:
   one or more memory units storing instructions; and
   one or more processors coupled to a vehicle, wherein execution of the instructions by the one or more processors causes the one or more processors to:
   receive sensor data captured by one or more sensors of the vehicle during a first time period, wherein the vehicle uses a first trained machine learning (ML) model to make one or more decisions of a decision type during the first time period;
   generate a one-shot trained ML model at least in part by using the sensor data to train the one-shot trained ML model;
   generate a plurality of candidate deep learning (DL) architectures using the one-shot trained ML model;

generate an optimal trained ML model based on at least one selected candidate DL architecture of the plurality of candidate DL architectures; and cause the vehicle to use the optimal trained ML model to make one or more further decisions of the decision type during a second time period after the first time period.

2. The system of claim 1, wherein the plurality of candidate DL architectures form a Pareto front, wherein generating the optimal trained ML model based on the at least one selected candidate DL architecture includes selecting the at least one selected candidate DL architecture from the plurality of candidate DL architectures based on Pareto optimality corresponding to the Pareto front.

3. The system of claim 1, wherein the one or more sensors of the vehicle include an image sensor of a camera, and wherein the sensor data includes image data captured by the image sensor.

4. The system of claim 1, wherein the one or more sensors of the vehicle include a depth sensor, and wherein the sensor data includes depth data captured by the depth sensor.

5. The system of claim 1, wherein the one or more sensors of the vehicle include a pose sensor, and wherein the sensor data includes pose data captured by the pose sensor.

6. The system of claim 1, wherein the decision type is associated with object recognition of an object other than the vehicle, wherein the vehicle and the object are both in an environment.

7. The system of claim 1, wherein the decision type is associated with at least one of tracking movement or predicting of an object other than the vehicle, wherein the vehicle and the object are both in an environment.

8. The system of claim 1, wherein the decision type is associated with mapping an environment that the vehicle is positioned within, wherein the environment includes the vehicle and one or more other objects.

9. The system of claim 1, wherein the decision type is associated with generating a route for the vehicle to traverse through an environment that the vehicle is positioned within, wherein the environment includes the vehicle and one or more other objects.

10. The system of claim 9, wherein execution of the instructions by the one or more processors causes the one or more processors to:
cause the vehicle to actuate one or more actuators of the vehicle to autonomously traverse the route.

11. The system of claim 1, wherein the decision type is associated with control over one or more actuators that control movement of the vehicle throughout an environment.

12. The system of claim 1, wherein, to generate the optimal trained ML model based on the at least one selected candidate DL architecture, the one or more processors are configured to train the optimal trained ML model from scratch.

13. The system of claim 1, wherein, to generate the optimal trained ML model based on the at least one selected candidate DL architecture, the one or more processors are configured to generate the optimal trained ML model based also on one or more parameters of the vehicle.

14. The system of claim 1, wherein causing the vehicle to use the optimal trained ML model to make the one or more further decisions of the decision type during the second time period includes transmitting the optimal trained ML model to the vehicle.

15. The system of claim 1, wherein execution of the instructions by the one or more processors causes the one or more processors to:
cause the vehicle to use the optimal trained ML model to make a decision of a second decision type during the second time period, wherein the second decision type is distinct from the decision type.

16. The system of claim 1, wherein execution of the instructions by the one or more processors causes the one or more processors to:
determine that the optimal trained ML model is more optimal than the first trained ML model for the decision type, wherein the one or more processors are configured to cause the vehicle to use the optimal trained ML model to make the one or more further decisions of the decision type during the second time period based on the optimal trained ML model being more optimal than the first trained ML model for the decision type.

17. The system of claim 1, wherein the optimal trained ML model is more accurate than the first trained ML model for the decision type.

18. The system of claim 1, wherein the optimal trained ML model is faster than the first trained ML model for the decision type.

19. A method for machine learning model optimization, the method comprising:
receiving sensor data captured by one or more sensors of a vehicle during a first time period, wherein the vehicle uses a first trained machine learning (ML) model to make one or more decisions of a first decision type during the first time period;
generating a one-shot trained ML model at least in part by using the sensor data to train the one-shot trained ML model;
generating a plurality of candidate deep learning (DL) architectures using the one-shot trained ML model;
generating an optimal trained ML model based on at least one selected candidate DL architecture of the plurality of candidate DL architectures; and
causing the vehicle to use the optimal trained ML model to make one or more further decisions of the first decision type during a second time period after the first time period.

20. A non-transitory computer readable storage medium having embodied thereon a program, wherein the program is executable by a processor to perform a method of machine learning model optimization, the method comprising:
receiving sensor data captured by one or more sensors of a vehicle during a first time period, wherein the vehicle uses a first trained machine learning (ML) model for one or more decisions of a first decision type during the first time period;
generating a one-shot trained ML model at least in part by using the sensor data to train the one-shot trained ML model;
generating a plurality of candidate deep learning (DL) architectures using the one-shot trained ML model;
generating an optimal trained ML model based on at least one selected candidate DL architecture of the plurality of candidate DL architectures; and
causing the vehicle to use the optimal trained ML model to make one or more further decisions of the first decision type during a second time period after the first time period.

* * * * *